US012581497B2

(12) United States Patent
Liu et al.

(10) Patent No.: US 12,581,497 B2
(45) Date of Patent: Mar. 17, 2026

(54) PHYSICAL DOWNLINK CONTROL CHANNEL TRANSMISSION METHOD AND RELATED APPARATUS

(71) Applicant: HUAWEI TECHNOLOGIES CO., LTD., Shenzhen (CN)

(72) Inventors: Fengwei Liu, Chengdu (CN); Minghui Xu, Shenzhen (CN); Jiayin Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 325 days.

(21) Appl. No.: 18/352,888

(22) Filed: Jul. 14, 2023

(65) Prior Publication Data

US 2023/0362948 A1      Nov. 9, 2023

Related U.S. Application Data

(63) Continuation of application No. PCT/CN2021/072331, filed on Jan. 15, 2021.

(51) Int. Cl.
*H04W 72/23* (2023.01)
*H04W 72/0446* (2023.01)

(52) U.S. Cl.
CPC ....... *H04W 72/23* (2023.01); *H04W 72/0446* (2013.01)

(58) Field of Classification Search
CPC .............. H04W 72/23; H04W 72/0446; H04L 5/0094; H04L 5/0053
See application file for complete search history.

(56) References Cited

U.S. PATENT DOCUMENTS

2019/0313383 A1 10/2019 Xiong et al.
2020/0015258 A1* 1/2020 Zhou ..................... H04W 72/20
(Continued)

FOREIGN PATENT DOCUMENTS

JP    2020507283 A    3/2020
WO    2018141139 A1    8/2018
WO    2020033652 A1    2/2020

OTHER PUBLICATIONS

"3rd Generation Partnership Project; Technical Specification Group Radio Access Network; NR; Radio Resource Control (RRC) protocol specification (Release 15)," 3GPP TS 38.331 V15.12.0, total 541 pages, Institute of Electrical and Electronics Engineers, New York, New York (Dec. 2020).

(Continued)

*Primary Examiner* — Christine Ng
(74) *Attorney, Agent, or Firm* — Leydig, Voit & Mayer, Ltd.

(57) ABSTRACT

A physical downlink control channel transmission method and a related apparatus are provided. The transmission method includes: A network device sends a resource configuration, where the resource configuration indicates a time domain resource used by the network device for PDCCH sending. The network device sends a PDCCH of a first terminal device on a first time domain resource in the time domain resource used by the network device for PDCCH sending, and sends a PDCCH of a second terminal device on a second time domain resource in the time domain resource used by the network device for PDCCH sending. In this way, a terminal device needs to monitor a PDCCH only on a portion of the time domain resource used for PDCCH sending and an increase in complexity of PDCCH monitoring of the terminal device may be avoided.

12 Claims, 10 Drawing Sheets

(56)  References Cited

U.S. PATENT DOCUMENTS

| | | | | |
|---|---|---|---|---|
| 2020/0045696 | A1* | 2/2020 | Huang | H04L 5/0007 |
| 2022/0287071 | A1* | 9/2022 | Seo | H04L 5/0094 |
| 2023/0006798 | A1* | 1/2023 | Lee | H04L 5/0055 |
| 2023/0131118 | A1* | 4/2023 | Kim | H04W 52/0216 |
| | | | | 370/311 |
| 2023/0262599 | A1* | 8/2023 | Jung | H04L 5/0007 |
| | | | | 370/311 |
| 2023/0371039 | A1* | 11/2023 | Tsai | H04W 72/232 |
| 2024/0080767 | A1* | 3/2024 | Zhang | H04W 52/0229 |

OTHER PUBLICATIONS

"3rd Generation Partnership Project; Technical Specification Group Radio Access Network; NR; Physical layer procedures for control (Release 15)," 3GPP TS 38.213 V15.12.0, total 110 pages, Institute of Electrical and Electronics Engineers, New York, New York (Dec. 2020).

* cited by examiner

First time domain resource
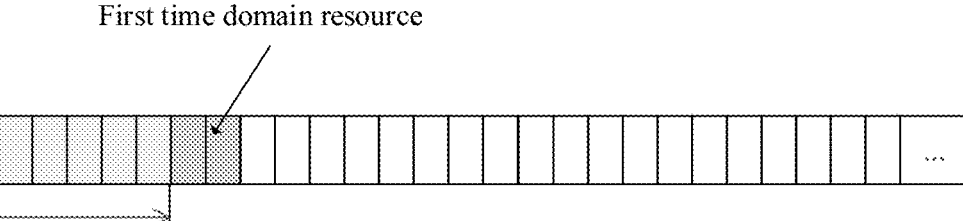
FIG. 7A
First time domain resource
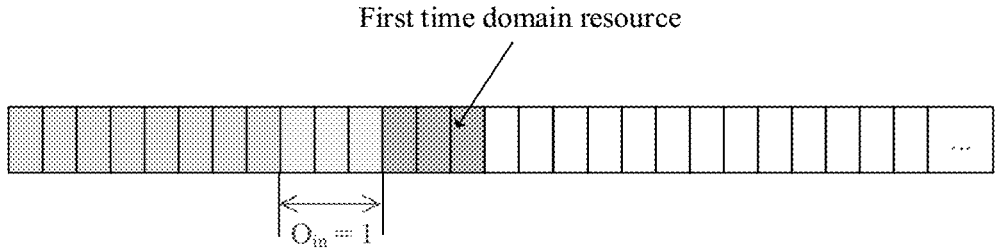
FIG. 7B
| 9 | 10 | 11 | | | | | | | | | |
|---|----|----|-----|-----|-----|-----|-----|-----|-----|-----|-----|
| 6 | 7 | 8 | ... | | | ... | | | ... | | |
| 3 | 4 | 5 | 3 | 4 | 5 | 3 | 4 | 5 | 3 | 4 | 5 |
| 0 | 1 | 2 | 0 | 1 | 2 | 0 | 1 | 2 | 0 | 1 | 2 |
FIG. 8A
| 9 | 10 | 11 | | | | | | | | | |
|---|----|----|-----|-----|-----|-----|-----|-----|-----|-----|-----|
| 6 | 7 | 8 | | | | | | | | | |
| 3 | 4 | 5 | ... | | | ... | | | ... | | |
| 0 | 1 | 2 | 12 | 13 | 14 | 24 | 25 | 26 | 36 | 37 | 38 |
FIG. 8B Symbol  0 1 2 3 4 5 6 7 8 9 10 11 12 13 14 15 16 17 18 19 20 21 22 23 24 25 26 27

Symbol  0 1 2 3 4 5 6 7 8 9 10 11 12 13 14 15 16 17 18 19 20 21 22 23 24 25 26 27

Symbol  0 1 2 3 4 5 6 7 8 9 10 11 12 13 14 15 16 17 18 19 20 21 22 23 24 25 26 27

Symbol  0 1 2 3 4 5 6 7 8 9 10 11 12 13 14 15 16 17 18 19 20 21 22 23 24 25 26 27

PHYSICAL DOWNLINK CONTROL CHANNEL TRANSMISSION METHOD AND RELATED APPARATUS

CROSS-REFERENCE TO RELATED APPLICATIONS

This application is a continuation of International Application No. PCT/CN2021/072331, filed on Jan. 15, 2021, the disclosure of which is hereby incorporated by reference in its entirety.

TECHNICAL FIELD

This application relates to the field of wireless local area network technologies, and in particular, to a physical downlink control channel (PDCCH) transmission method and a related apparatus.

BACKGROUND

In a related technology, a large subcarrier spacing is proposed, for example, a subcarrier spacing of 240 kHz, 480 kHz, 960 kHz, or even 1920 kHz. This helps increase a maximum quantity of fast Fourier transform (FFT) points and meet an increasingly high requirement for a data demodulation delay.

However, in a new radio (NR) system, a shared channel is scheduled based on a slot in terms of time (with 14 orthogonal frequency division multiplexing (OFDM) symbols) or a mini-slot (with 2 to 13 OFDM symbols) in terms of time. Duration of the slot is determined by a subcarrier spacing (SCS). A larger subcarrier spacing indicates shorter duration of the slot.

In an existing NR system, a frame is defined as 10 ms. When a subcarrier spacing is 120 KHz, a frame may include 80 slots. If a network device configures a periodicity of monitoring a PDCCH by a terminal device to be 40 slots, an offset to be 10 slots, and monitoring duration to be 3 slots, the terminal device needs to monitor the physical downlink control channel (PDCCH) in slots {10, 11, 12} (m=0) of a frame 0, slots {50, 51, 52} (m=1) of the frame 0, slots {10, 11, 12} (m=2) of a frame 1, slots {50, 51, 52} (m=3) of the frame 1, and the like.

When a data subcarrier spacing is increased from 120 kHz in the existing NR system to 480 kHz or 960 kHz, duration of one slot is significantly shortened. If a PDCCH-monitoring periodicity and monitoring duration the same as those configured when the subcarrier spacing is 120 KHz are configured, when the subcarrier spacing is 480 kHz, a PDCCH-monitoring frequency is four times that when the subcarrier spacing is 120 KHz, and a monitoring interval between a plurality of times of consecutive monitoring is ¼ of 120 KHz. In addition, when the subcarrier spacing is 960 kHz, a monitoring frequency is eight times that when the subcarrier spacing is 120 kHz, and a monitoring interval between a plurality of times of consecutive monitoring is ⅛ of 120 kHz. A high requirement is imposed on a monitoring capability of the terminal device. In the related technology, multi-slot monitoring is proposed. To be specific, a quantity of slots in an interval between two adjacent times of monitoring in one monitoring periodicity is increased.

In the multi-slot monitoring, a monitoring interval between two consecutive times of monitoring in the monitoring periodicity may be increased. If a quantity of symbols for sending a PDCCH at a time is limited to less than 3, a quantity of PDCCHs that can be monitored is limited, and it cannot be ensured that sufficient users are served. To ensure a quantity of terminals that can detect the PDCCH, the quantity of PDCCHs needs to be increased. For example, a maximum of three time domain symbols for sending the PDCCH is multiplied to a maximum of 12 or 24. To maintain a proportion occupied by symbols used to monitor the PDCCH in a plurality of slots, a quantity of symbols used to monitor the PDCCH needs to be increased. This increases complexity of PDCCH monitoring of the terminal device.

SUMMARY

Embodiments of this application provide a physical downlink control channel transmission method and a related apparatus, so that in a large subcarrier scenario, sufficient users can be served, and an increase in complexity of monitoring a PDCCH by a terminal device can also be avoided.

According to a first aspect, this application provides a physical downlink control channel transmission method, including:

a network device sends a resource configuration, where the resource configuration indicates a time domain resource used by the network device for physical downlink control channel PDCCH sending; and the network device sends a PDCCH of a first terminal device on a first time domain resource in the time domain resource used by the network device for PDCCH sending, and sends a PDCCH of a second terminal device on a second time domain resource in the time domain resource used by the network device for PDCCH sending.

According to the technical solution in this application, the PDCCHs are separately sent to different terminal devices on different time domain resources. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided, thereby improving multi-slot scheduling efficiency.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration further includes a first time domain resource configuration, and the first time domain resource configuration includes a start symbol of the first time domain resource and a quantity of symbols of the first time domain resource. In this way, the first terminal device may determine the location of the first time domain resource based on the first time domain resource configuration, and monitor the PDCCH on the first time domain resource.

In some implementations, the resource configuration is carried in a field in search space and/or a control-resource set (CORESET) field.

In a possible implementation, a configuration of the start symbol of the first time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

In another possible implementation, a configuration of the start symbol of the first time domain resource is carried in a second field in the search space, a length of the second field is $S_{max}$, and $S_{max}$ is a maximum quantity of slots included in the time domain resource used by the network device for PDCCH sending. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The first terminal device can obtain the start symbol of the first time domain resource based on the offset.

In a possible implementation, the search space or CORESET includes a field indicating the offset. In this way, the first terminal device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, the first time domain resource is determined based on one or more of an identifier of the first terminal device, a slot index, or a quantity of monitoring times in a current periodicity. In this way, overheads of indicating the first time domain resource configuration by the network device to the first terminal device can be reduced.

In some implementations, the quantity of symbols of the first time domain resource is different from a quantity of symbols of the second time domain resource. In this way, grouping of time domain resources used by the network device for PDCCH sending is more flexible, so that an actual requirement can be better adapted.

In some implementations, the quantity of symbols of the first time domain resource is positively correlated with an aggregation level corresponding to the first time domain resource. In this solution, the network device and the first terminal device can determine the location of the first time domain resource based on the aggregation level. Alternatively, the network device and the first terminal device can determine the aggregation level based on the location of the first time domain resource. This helps reduce signaling overheads.

In some implementations, the symbols of the first time domain resource belong to one slot. In this way, the first terminal device can be prevented from monitoring the PDCCH across slots, thereby reducing complexity of PDCCH monitoring of the terminal device.

It should be understood that the implementations of the first time domain resource are also used for the second time domain resource, and details are not described again.

According to a second aspect, an implementation of this application provides a PDCCH transmission method, including:

a terminal device receives a resource configuration, where the resource configuration includes a time domain resource used by a network device to send a PDCCH; and the terminal device monitors a PDCCH of the terminal device on a portion of the time domain resource used by the network device for PDCCH sending.

According to the technical solution in this application, the terminal device needs to monitor the PDCCH only on the portion of the time domain resource used for PDCCH sending. In this way, when a quantity of symbols used by the network device for PDCCH sending is increased to meet requirements of a plurality of users, an increase in complexity of PDCCH monitoring of the terminal device can also be avoided.

A location of the portion of the time domain resource may be sent by the network device to the terminal device, or may be obtained by the terminal device and the network device in an agreed manner.

In some implementations, the resource configuration further includes a first resource configuration indicating the portion of the time domain resource, and the first time domain resource configuration includes a start symbol of the portion of the time domain resource and a quantity of symbols of the portion of the time domain resource. In this way, the terminal device may determine the location of the first time domain resource based on the first time domain resource configuration, and monitor the PDCCH on the first time domain resource.

In some implementations, the resource configuration is carried in a field in search space and/or a CORESET field.

In a possible implementation, a configuration of the start symbol of the portion of the time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the terminal can directly obtain the location of the start symbol of the first time domain resource based on the first field.

In another possible implementation, a first OFDM symbol of the portion of the time domain resource is a start symbol of a slot, a configuration of the start symbol of the first time domain resource is carried in a second field in the search space, a length of the second field is $S_{max}$, and $S_{max}$ is a maximum quantity of slots of a PDCCH-monitoring span. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The terminal device can obtain the start symbol of the first time domain resource based on the offset.

In a possible implementation, the search space includes a field indicating the offset. In this way, the terminal device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, before the terminal device monitors the PDCCH of the terminal device on the portion of the time domain resource used by the network device for PDCCH sending, the method further includes: The terminal device determines the portion of the time domain resource based on one or more of an identifier of the terminal device, a slot index, or a quantity of monitoring times in a current periodicity. In this solution, the terminal device may not need to receive, from the network device, the first time domain resource configuration indicating the first time domain resource, so that overheads of indicating the first time domain resource configuration by the network device to the first terminal device can be reduced.

In some implementations, the quantity of symbols of the portion of the time domain resource is positively correlated with an aggregation level corresponding to the portion of the time domain resource. In this solution, the network device and the terminal device can determine the location of the first time domain resource based on the aggregation level. Alternatively, the network device and the terminal device can determine the aggregation level based on the location of the first time domain resource. This helps reduce signaling overheads.

In some implementations, the symbols of the portion of the time domain resource belong to one slot. In this way, the terminal device can be prevented from monitoring the PDCCH across slots, thereby reducing complexity of PDCCH monitoring of the terminal device.

It should be understood that the implementations of the first time domain resource are also used for the second time domain resource, and details are not described again.

According to a third aspect, this application further provides a PDCCH transmission method, including:

a network device sends a resource configuration, where the resource configuration includes a first time domain resource configuration and a second time domain resource configuration, the first time domain resource configuration indicates a first time domain resource, and the second time domain resource configuration indicates a second time domain resource;

the network device sends a PDCCH to a first terminal device on the first time domain resource, and sends a PDCCH to a second terminal device on the second time domain resource.

In this solution, a time domain resource used to send the PDCCH is divided into the first time domain resource and the second time domain resource. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration is carried in a field in search space and/or a control-resource set (CORESET) field.

In a possible implementation, a configuration of a start symbol of the first time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

According to a fourth aspect, this application further provides a PDCCH transmission method, including:

a terminal device receives a first time domain resource configuration from a network device, where the first time domain resource configuration includes a start symbol of a first time domain resource and a quantity of symbols of the first time domain resource, and the first time domain resource is a portion of a time domain resource used by the network device for PDCCH sending; and the terminal device monitors the PDCCH on the first time domain resource based on the first time domain resource configuration.

In this solution, the terminal device needs to monitor the PDCCH only on a portion of the time domain resource used for PDCCH sending, so that multi-slot scheduling can be better implemented, and an increase in complexity of PDCCH monitoring of the terminal device can also be avoided.

Symbols of the first time domain resource may be consecutive or separated.

In a possible implementation, a configuration of the start symbol of the first time domain resource is carried in a first field in search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

According to a fifth aspect, an implementation of this application further provides a PDCCH transmission apparatus. The transmission apparatus may be a network device, or may be used in a network device. The transmission apparatus includes an input/output unit and a processing unit. The input/output unit may be or may be deployed in a unit or module that can implement an information receiving/sending function, such as a transceiver, a transceiver antenna, or an input/output interface. The processing unit may be or may be deployed in a processor. The input/output unit is configured to:

send a resource configuration, where the resource configuration indicates a time domain resource used by the network device for physical downlink control channel PDCCH sending; and send a PDCCH of a first terminal device on a first time domain resource in the time domain resource used by the network device for PDCCH sending, and send a PDCCH of a second terminal device on a second time domain resource in the time domain resource used by the network device for PDCCH sending.

According to the technical solution in this application, the PDCCHs are separately sent to different terminal devices on different time domain resources. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration further includes a first time domain resource configuration, and the first time domain resource configuration includes a start symbol of the first time domain resource and a quantity of symbols of the first time domain resource. In this way, the first terminal device may determine the location of the first time domain resource based on the first time domain resource configuration, and monitor the PDCCH on the first time domain resource.

In some implementations, the resource configuration is carried in a field in search space and/or a control-resource set (CORESET) field.

In a possible implementation, a configuration of the start symbol of the first time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

In another possible implementation, a configuration of the start symbol of the first time domain resource is carried in a second field in the search space, a length of the second field is $S_{max}$, and $S_{max}$ is a maximum quantity of slots included in the time domain resource used by the network device for PDCCH sending. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The first terminal device can obtain the start symbol of the first time domain resource based on the offset.

In a possible implementation, the search space or CORESET includes a field indicating the offset. In this way, the first terminal device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, the first time domain resource is determined by the processing unit based on one or more of an identifier of the first terminal device, a slot index, or a quantity of monitoring times in a current periodicity. In this way, overheads of indicating the first time domain resource configuration by the network device to the first terminal device can be reduced.

In some implementations, the quantity of symbols of the first time domain resource is different from a quantity of symbols of the second time domain resource. In this way, grouping of time domain resources used by the network device for PDCCH sending is more flexible, so that an actual requirement can be better adapted.

In some implementations, the quantity of symbols of the first time domain resource is positively correlated with an aggregation level corresponding to the first time domain resource. In this solution, the network device and the first terminal device can determine the location of the first time domain resource based on the aggregation level. Alternatively, the network device and the first terminal device can determine the aggregation level based on the location of the first time domain resource. This helps reduce signaling overheads.

In some implementations, the symbols of the first time domain resource belong to one slot. In this way, the first terminal device can be prevented from monitoring the PDCCH across slots, thereby reducing complexity of PDCCH monitoring of the terminal device.

It should be understood that the implementations of the first time domain resource are also used for the second time domain resource, and details are not described again.

According to a sixth aspect, this application further provides a PDCCH transmission apparatus. The transmission apparatus may be but is not limited to a terminal device, or may be used in but not limited to a terminal device. The transmission apparatus may include an input/output unit and a processing unit. The input/output unit may be or may be deployed in a unit or module that can implement an information receiving/sending function, such as a transceiver, a transceiver antenna, or an input/output interface. The processing unit may be or may be deployed in a processor. The input/output unit is configured to:

receive a resource configuration, where the resource configuration includes a time domain resource used by a network device to send a PDCCH; and monitor a PDCCH of the terminal device on a portion of the time domain resource used by the network device for PDCCH sending.

According to the technical solution in this application, the terminal device needs to monitor the PDCCH only on the portion of the time domain resource used for PDCCH sending. In this way, when a quantity of symbols used by the network device for PDCCH sending is increased to meet requirements of a plurality of users, an increase in complexity of PDCCH monitoring of the terminal device can be avoided.

A location of the portion of the time domain resource may be sent by the network device to the terminal device, or may be obtained by the terminal device and the network device in an agreed manner.

In some implementations, the resource configuration further includes a first resource configuration indicating the portion of the time domain resource, and the first time domain resource configuration includes a start symbol of the portion of the time domain resource and a quantity of symbols of the portion of the time domain resource. In this way, the terminal device may determine the location of the first time domain resource based on the first time domain resource configuration, and monitor the PDCCH on the first time domain resource.

In some implementations, the resource configuration is carried in a field in search space and/or a CORESET field.

In a possible implementation, a configuration of the start symbol of the portion of the time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the terminal can directly obtain the location of the start symbol of the first time domain resource based on the first field.

In another possible implementation, a first OFDM symbol of the portion of the time domain resource is a start symbol of a slot, a configuration of the start symbol of the first time domain resource is carried in a second field in the search space, a length of the second field is $S_{max}$, and $S_{max}$ is a maximum quantity of slots of a PDCCH-monitoring span. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The terminal device can obtain the start symbol of the first time domain resource based on the offset.

In a possible implementation, the search space includes a field indicating the offset. In this way, the device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, before the terminal device monitors the PDCCH of the terminal device on the portion of the time domain resource used by the network device for PDCCH sending, the processing unit is configured to determine the portion of the time domain resource based on one or more of an identifier of the terminal device, a slot index, or a quantity of monitoring times in a current periodicity. In this solution, the terminal device may not need to receive, from the network device, the first time domain resource configuration indicating the first time domain resource, so that overheads of indicating the first time domain resource configuration by the network device to the first terminal device can be reduced.

In some implementations, the quantity of symbols of the portion of the time domain resource is positively correlated with an aggregation level corresponding to the portion of the time domain resource. In this solution, the network device and the first terminal device can determine the location of the first time domain resource based on the aggregation level. Alternatively, the network device and the first terminal device can determine the aggregation level based on the location of the first time domain resource. This helps reduce signaling overheads.

In some implementations, the symbols of the portion of the time domain resource belong to one slot. In this way, the terminal device can be prevented from monitoring the PDCCH across slots, thereby reducing complexity of PDCCH monitoring of the terminal device.

It should be understood that the implementations of the first time domain resource are also used for the second time domain resource, and details are not described again.

According to a seventh aspect, an implementation of this application further provides a PDCCH transmission apparatus. The transmission apparatus may be a network device, or may be used in a network device. The transmission apparatus includes an input/output unit and a processing unit. The input/output unit may be or may be deployed in a unit or module that can implement an information receiving/sending function, such as a transceiver, a transceiver antenna, or an input/output interface. The processing unit may be or may be deployed in a processor. The input/output unit is configured to:

send a resource configuration, where the resource configuration includes a first time domain resource configuration and a second time domain resource configuration, the first time domain resource configuration indicates a first time domain resource, and the second time domain resource configuration indicates a second time domain resource; and send a PDCCH to a first terminal device on the first time domain resource, and send the PDCCH to a second terminal device on the second time domain resource.

In this solution, a time domain resource used to send the PDCCH is divided into the first time domain resource and the second time domain resource. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration is carried in a field in search space and/or a control-resource set (CORESET) field.

In a possible implementation, a configuration of the start symbol of the first time domain resource is carried in a first field in search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

According to an eighth aspect, this application further provides a PDCCH transmission apparatus. The transmission apparatus may be but is not limited to a terminal device, or may be used in but not limited to a terminal device. The transmission apparatus may include an input/output unit and a processing unit. The input/output unit may be or may be deployed in a unit or module that can implement an information receiving/sending function, such as a transceiver, a transceiver antenna, or an input/output interface. The processing unit may be or may be deployed in a processor. The input/output unit is configured to:

receive a first time domain resource configuration from a network device, where the first time domain resource configuration includes a start symbol of a first time domain resource and a quantity of symbols of the portion of the time domain resource, and the first time domain resource is a portion of a time domain resource used by the network device for PDCCH sending; and monitor the PDCCH on the first time domain resource based on the first time domain resource configuration.

In this solution, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

Symbols of the first time domain resource may be consecutive or separated.

In a possible implementation, a configuration of the start symbol of the first time domain resource is carried in a first field in search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

According to a ninth aspect, this application provides a communication device. The communication device includes a processor, and the processor is coupled to a memory. When the processor executes a computer program or instructions in the memory, the method in any implementation of the first aspect is performed.

Optionally, the apparatus further includes the memory.

Optionally, the apparatus further includes a communication interface, and the processor is coupled to the communication interface.

Optionally, there are one or more processors, and there are one or more memories.

Optionally, the memory may be integrated with the processor, or the memory and the processor are separately disposed.

Optionally, a transceiver may include a transmitter machine (transmitter) and a receiver machine (receiver).

In an implementation, the communication device is a network device or a terminal device. When the communication device is a network device or a terminal device, the communication interface may be a transceiver or an input/output interface. Optionally, the transceiver may be a transceiver circuit. Optionally, the input/output interface may be an input/output circuit.

In another implementation, the communication device is a chip or a chip system. When the apparatus is a chip or a chip system, the communication interface may be an input/output interface, an interface circuit, an output circuit, an input circuit, a pin, a related circuit, or the like on the chip or in the chip system. The processor may alternatively be embodied as a processing circuit or a logic circuit.

According to a tenth aspect, this application provides a communication system. The communication system includes the transmission apparatus in the fifth aspect and the transmission apparatus in the sixth aspect, or the communication system includes the transmission apparatus in the seventh aspect and the transmission apparatus in the eighth aspect.

According to an eleventh aspect, this application provides a computer program product. The computer program product includes a computer program (which may also be referred to as code or instructions). When being run, the computer program enables a computer to perform the method in any possible implementation of the first aspect to the fourth aspect.

According to a twelfth aspect, this application provides a computer-readable storage medium. The computer-readable storage medium stores a computer program (which may also be referred to as code or instructions). When the computer program is run on a computer, the computer is enabled to perform the method in any possible implementation of the first aspect to the fourth aspect.

According to a thirteenth aspect, this application further provides a circuit, including a processor and an interface, configured to execute a computer program or instructions stored in a memory, to perform the method in any possible implementation of the first aspect to the fourth aspect.

BRIEF DESCRIPTION OF DRAWINGS

FIG. 7A is a schematic diagram of another PDCCH sending scenario according to an embodiment of this application:

FIG. 7B is a schematic diagram of another PDCCH sending scenario according to an embodiment of this application:

FIG. 8A is a schematic diagram of numbering a CCE group according to an embodiment of this application:

FIG. 8B is a schematic diagram of numbering a CCE group according to an embodiment of this application:

DESCRIPTION OF EMBODIMENTS

The following describes embodiments of the present application with reference to the accompanying drawings in embodiments of the present application.

Figure 1:
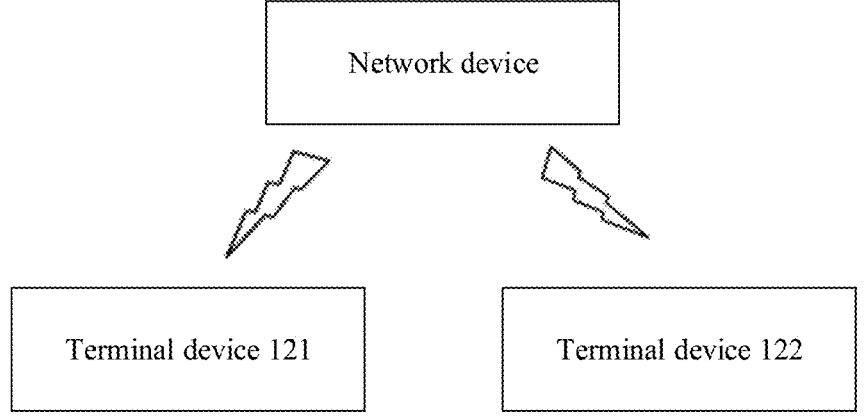
FIG. 1 is a schematic diagram of a network architecture of a communication system according to an embodiment of this application.

FIG. 1 is a schematic diagram of a network architecture of a communication system according to an embodiment of this application. The communication system includes a network device and a plurality of terminal devices (for example, a terminal device 121 and a terminal device 122 in FIG. 1). The terminal device 121 and the terminal device 122 may communicate with the network device 111.

The communication system may be a communication system supporting a fourth generation (4G) access technology, for example, a long term evolution (LTE) access technology. Alternatively, the communication system may be a communication system supporting a fifth generation (5G) access technology, for example, a new radio (NR) access technology. Alternatively, the communication system may be a communication system supporting a third generation (3G) access technology, for example, a universal mobile telecommunications system (UMTS) access technology. Alternatively, the communication system may be a communication system supporting a second generation (2G) access technology, for example, a global system for mobile communications (GSM) access technology: Alternatively, the communication system may be a communication system supporting a plurality of wireless technologies, for example, an LTE technology and an NR technology. In addition, the communication system may be used in a future-oriented communication technology.

The network device 111 in FIG. 1 may be a next generation nodeB (gNB), a transmission reception point (TRP), a relay node, an access point (AP), or the like in a communication system based on 5G or a future generation access technology.

The terminal device in FIG. 1 may be a device that provides a voice or data connectivity for a user. For example, the terminal device may also be referred to as user equipment (user equipment, UE), a mobile station, a subscriber unit, a station, or terminal equipment (terminal equipment, TE). The terminal may be a cellular phone, a personal digital assistant (personal digital assistant, PDA), a wireless modem, a handheld device, a laptop computer, a cordless phone, a wireless local loop (WLL) station, a tablet computer (pad), or the like. With development of wireless communication technologies, a device that can access a communication system, a device that can communicate with a network side in the communication system, or a device that can communicate with another object by using the communication system may be the terminal in embodiments of this application, for example, a terminal and a vehicle in intelligent transportation, a household device in a smart home, an electricity meter reading instrument in a smart grid, a voltage monitoring instrument, an environment monitoring instrument, a video surveillance instrument in an intelligent security network, or a cashing machine. In embodiments of this application, the terminal may communicate with a network device, for example, the network device 111 or a network device 112. A plurality of terminals may communicate with each other. The terminal may be fixed or movable.

Figure 2A:
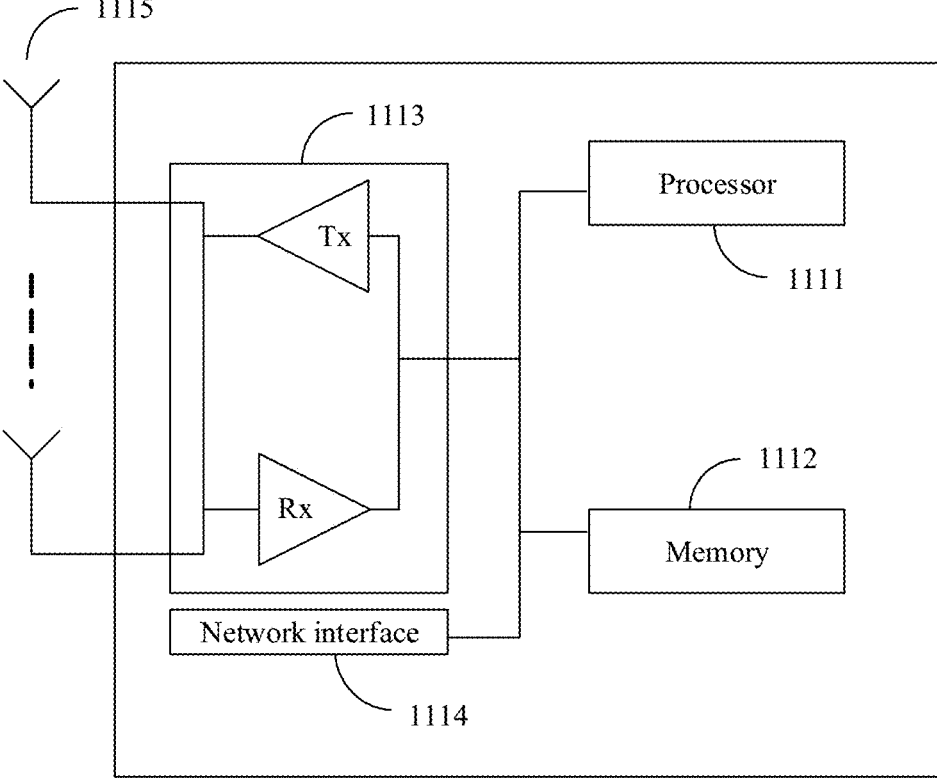
FIG. 2A is a schematic diagram of a structure of a network device according to an embodiment of this application.

FIG. 2A is a schematic diagram of a structure of a network device. For a structure of the network device in this embodiment of this application, refer to the structure shown in FIG. 2A.

The network device includes at least one processor 1111, at least one transceiver 1113, at least one network interface 1114, and one or more antennas 1115. Optionally, the network device further includes at least one memory 1112. The processor 1111, the memory 1112, the transceiver 1113, and the network interface 1114 are connected to each other, for example, by using a bus. The antennas 1115 are connected to the transceiver 1113. The network interface 1114 is configured to enable the network device to be connected to another communication device through a communication link. For example, the network device is connected to a core network element 101 through an SI interface. In this embodiment of this application, the connection may include various types of interfaces, transmission lines, buses, or the like. This is not limited in this embodiment.

A processor in this embodiment of this application, for example, the processor 1111, may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 1111 may be a single-core (single-CPU) processor or a multi-core (multi-CPU) processor. The at least one processor 1111 may be integrated into one chip or located on a plurality of different chips.

A memory in this embodiment of this application, for example, the memory 1112, may include at least one of the following types: a read-only memory (ROM) or another type of static storage device that can store static information and instructions, a random access memory (RAM) or another type of dynamic storage device that can store information and instructions, or an electrically erasable programmable read-only memory (EEPROM). In some scenarios, the memory may alternatively be a compact disc read-only memory (CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer. However, the memory is not limited thereto.

The memory 1112 may exist independently, and is connected to the processor 1111. Optionally, the memory 1112 may alternatively be integrated with the processor 1111, for example, integrated into a chip. The memory 1112 can store program code for executing the technical solutions in embodiments of this application, and the processor 1111 controls the execution. Various types of executed computer program code may also be considered as drivers of the processor 1111. For example, the processor 1111 is configured to execute the computer program code stored in the memory 1112, to implement the technical solutions in embodiments of this application.

The transceiver 1113 may be configured to support receiving or sending of a radio frequency signal between the network device and a terminal, and the transceiver 1113 may be connected to the antenna 1115.

The transceiver 1113 includes a transmitter Tx and a receiver Rx. Specifically, the one or more antennas 1115 may receive a radio frequency signal. The receiver Rx of the transceiver 1113 is configured to: receive the radio frequency signal from the antennas, convert the radio frequency signal into a digital baseband signal or a digital intermediate frequency signal, and provide the digital baseband signal or the digital intermediate frequency signal for the processor 1111, so that the processor 1111 further processes, for example, demodulates or decodes, the digital baseband signal or the digital intermediate frequency signal. In addition, the transmitter Tx in the transceiver 1113 is further configured to receive a modulated digital baseband signal or digital intermediate frequency signal from the processor 1111, convert the modulated digital baseband signal or digital intermediate frequency signal into a radio frequency signal, and send the radio frequency signal through the one or more antennas 1115. Specifically, the receiver Rx may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transmitter Tx may selectively perform one or more levels of frequency up-mixing processing and digital-to-analog conversion processing on the modulated digital baseband signal or the modulated digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal.

The transceiver 1113 may also be understood as an input/output unit.

Optionally, the network device 111 may include a baseband unit (BBU), a radio remote unit (RRU), and an antenna. The BBU is connected to the RRU, and the RRU is connected to the antenna.

Optionally, the network device 112 may include a baseband unit (baseband unit, BBU), a radio remote unit (RRU), and an antenna. The BBU is connected to the RRU, and the RRU is connected to the antenna.

Figure 2B:
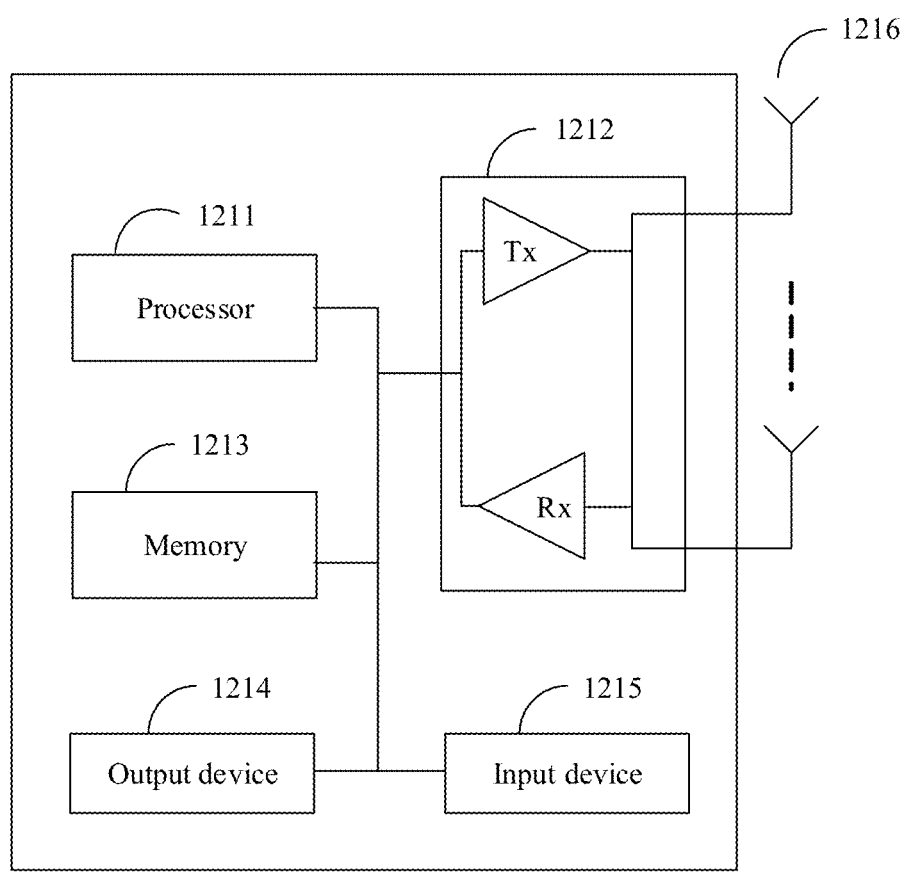
FIG. 2B is a schematic diagram of a structure of a terminal device according to an embodiment of this application.

FIG. 2B is a schematic diagram of a structure of a terminal device according to an embodiment of this application. For structures of the terminal device 121 and the terminal device 122, refer to the structure shown in FIG. 2B.

The terminal device includes at least one processor 1211 and at least one transceiver 1212. Optionally, the terminal device 121 may further include at least one memory 1213. The processor 1211, the memory 1213, and the transceiver 1212 are connected to each other. Optionally, the terminal device 121 may further include an output device 1214, an input device 1215, and one or more antennas 1216. The antennas 1216 are connected to the transceiver 1212, and the output device 1214 and the input device 1215 are connected to the processor 1211.

For the transceiver 1212, the memory 1213, and the antennas 1216, refer to the related descriptions in FIG. 2A, to implement similar functions.

The processor 1211 may be a baseband processor, or may be a CPU. The baseband processor and the CPU may be integrated or separated.

The processor 1211 may be configured to implement various functions for the terminal device 121, for example, configured to process a communication protocol and communication data, or configured to: control the entire terminal device 121, execute a software program, and process data of the software program, or configured to assist in completing a computing processing task, for example, graphics and image processing or audio processing. Alternatively, the processor 1211 is configured to implement one or more of the foregoing functions.

The output device 1214 communicates with the processor 1211, and may display information in a plurality of manners. For example, the output device 1214 may be a liquid crystal display (LCD), a light emitting diode (LED) display device, a cathode ray tube (CRT) display device, a projector, or the like. The input device 1215 communicates with the processor 1211, and may receive an input of a user in a plurality of manners. For example, the input device 1215 may be a mouse, a keyboard, a touchscreen device, or a sensing device.

In an access technology, a network device first configures, for a terminal device, a time domain resource used to send a PDCCH, and the terminal device monitors the time domain resource used to send the PDCCH to obtain the PDCCH, obtains related scheduling information (for example, a slot for scheduling and sending the PDSCH) of the PDSCH, and then receives the PDSCH based on the obtained scheduling information.

Figure 3:
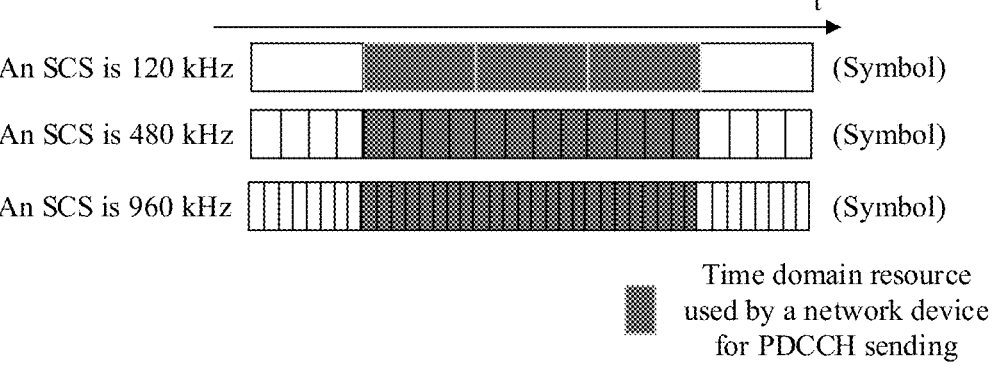
FIG. 3 is a schematic diagram of a PDCCH transmission scenario according to this application.

However, in a schematic diagram of a scenario shown in FIG. 3, absolute duration of a slot is negatively correlated with a subcarrier spacing. In other words, a larger subcarrier spacing indicates shorter absolute duration of a slot, and therefore, shorter absolute duration of a symbol.

In a scenario with a large subcarrier spacing (for example, the subcarrier spacing is greater than or equal to 480 kHz), multi-slot monitoring usually needs to be implemented. A PDCCH-monitoring span or a monitoring window includes a plurality of slots, and the network device may send the PDCCH in only some slots in one monitoring span. For example, when the subcarrier spacing is 480 kHz, a PDCCH-monitoring span includes 4 slots. When the subcarrier spacing is 960 kHz, a PDCCH-monitoring span includes 8 slots. The PDCCH-monitoring span may also be referred to as a monitoring span. In this application, the monitoring span may also be understood as a monitoring window: In this application, the monitoring span is used for description.

For example, a monitoring periodicity $K_s$ is 40 slots, a monitoring offset 0s is 10 slots, and a slot length $T_s$ of monitoring in one monitoring periodicity is 3 slots. In a scenario of single-slot monitoring or a scenario in which the monitoring span includes a single slot, descriptions are provided as follows:

If the SCS is 120 kHz, one frame includes 80 slots, and a frame 0 $\{10, 11, 12\}$, a frame 0 $\{50, 51, 52\}$, a frame 1 $\{10, 11, 12\}$, a frame 1 $\{50, 51, 52\}$, and the like are used by the terminal device for PDCCH monitoring. A value in "$\{$ $\}$" is a slot number. For example, the frame 0 $\{10, 11, 12\}$ refers to a slot 10, a slot 11, and a slot 12 in a frame 0. The slot 10 is a PDCCH-monitoring span, the slot 11 is a PDCCH-monitoring span, the slot 12 is a PDCCH-monitoring span, a slot 50 is a PDCCH-monitoring span, a slot 51 is a PDCCH-monitoring span, and a slot 52 is a PDCCH-monitoring span.

If the SCS is 480 kHz, one frame includes 320 slots, and a frame 0 $\{10, 11, 12\}$, a frame 0 $\{50, 51, 52\}$, a frame 0 $\{90, 91, 92\}$, . . . , a frame 0 $\{290, 291, 292\}$, a frame 1 $\{10, 11, 12\}$, a frame 1 $\{50, 51, 52\}$, and the like are used by the terminal device for PDCCH monitoring. The slot 10 is a PDCCH-monitoring span, the slot 11 is a PDCCH-monitoring span, the slot 12 is a PDCCH-monitoring span, a slot 50 is a PDCCH-monitoring span, a slot 51 is a PDCCH-monitoring span, and a slot 52 is a PDCCH-monitoring span.

If the SCS is 960 kHz, one frame includes 640 slots, and a frame 0 $\{10, 11, 12\}$, a frame 0 $\{50, 51, 52\}$, a frame 0 $\{90, 91, 92\}$, . . . , a frame 0 $\{610, 611, 612\}$, a frame 1 $\{10, 11, 12\}$, a frame 1 $\{50, 51, 52\}$, and the like are used by the terminal device for PDCCH monitoring.

When the SCS is 480 kHz, time between braces is ¼ of 120 kHz, and time between two digits in a brace is ¼ of that when the SCS is 120 KHz. To be specific, compared with 120 kHz, the large subcarrier spacing significantly increases a monitoring frequency, and a time interval between first symbols of two adjacent monitoring spans in one monitoring periodicity is definitely shortened. This increases complexity of PDCCH monitoring of the terminal device. Therefore, it is proposed that a quantity of slots included in the monitoring span of the large subcarrier spacing be increased, and a time interval between two adjacent monitoring spans in one monitoring periodicity be increased, to reduce complexity of PDCCH monitoring of the terminal device.

For example, $K_s=40$, $O_s=10$, and $T_s=12$ (480 kHz) or 24 (960 kHz). In a scenario in which the monitoring span includes a plurality of slots, descriptions are provided as follows:

If the SCS is 480 kHz, one frame includes 320 slots, and a frame 0 {10, 14, 18}, a frame 0 {50, 54, 58}, a frame 0 {90, 94, 98}, . . . , a frame 0 {290, 294, 298}, a frame 1 {10, 14, 18}, a frame 1 {50, 54, 58}, and the like are used by the terminal device for PDCCH monitoring. A slot 10 to a slot 13 are a PDCCH-monitoring span, a slot 14 to a slot 17 are a PDCCH-monitoring span, a slot 18 to a slot 21 are a PDCCH-monitoring span, a slot 50 to a slot 53 are a PDCCH-monitoring span, a slot 54 to a slot 57 are a PDCCH-monitoring span, and a slot 58 to a slot 61 are a PDCCH-monitoring span. It can be learned that, in the scenario in which the monitoring span includes a plurality of slots, in a PDCCH-monitoring span, only some slots are used for PDCCH sending. In other words, in a PDCCH-monitoring span, only some slots are used by the terminal device for PDCCH monitoring.

If the SCS is 960 kHz, one frame includes 640 slots, and a frame 0 {10, 18, 26}, a frame 0 {50, 58, 66}, a frame 0 {90, 98, 106}, . . . , a frame 0 {610, 618, 626}, a frame 1 {10, 18, 26}, a frame 1 {50, 58, 66}, and the like are used by the terminal device for PDCCH monitoring.

In the scenario in which the monitoring span includes a plurality of slots, if a quantity of symbols of the time domain resource used to send the PDCCH remains unchanged, the PDCCH cannot carry a sufficient quantity of scheduling information, and it is difficult to meet a requirement of scheduling and sending, for more users, PDSCHs of the users.

If the quantity of symbols of the time domain resource used to send the PDCCH is increased, a quantity of symbols that each terminal device needs to monitor is also increased, that is, a quantity of PDCCH candidates that the user needs to monitor is increased. Consequently, a process in which the terminal device monitors the PDCCH is more complex.

Figure 4A:
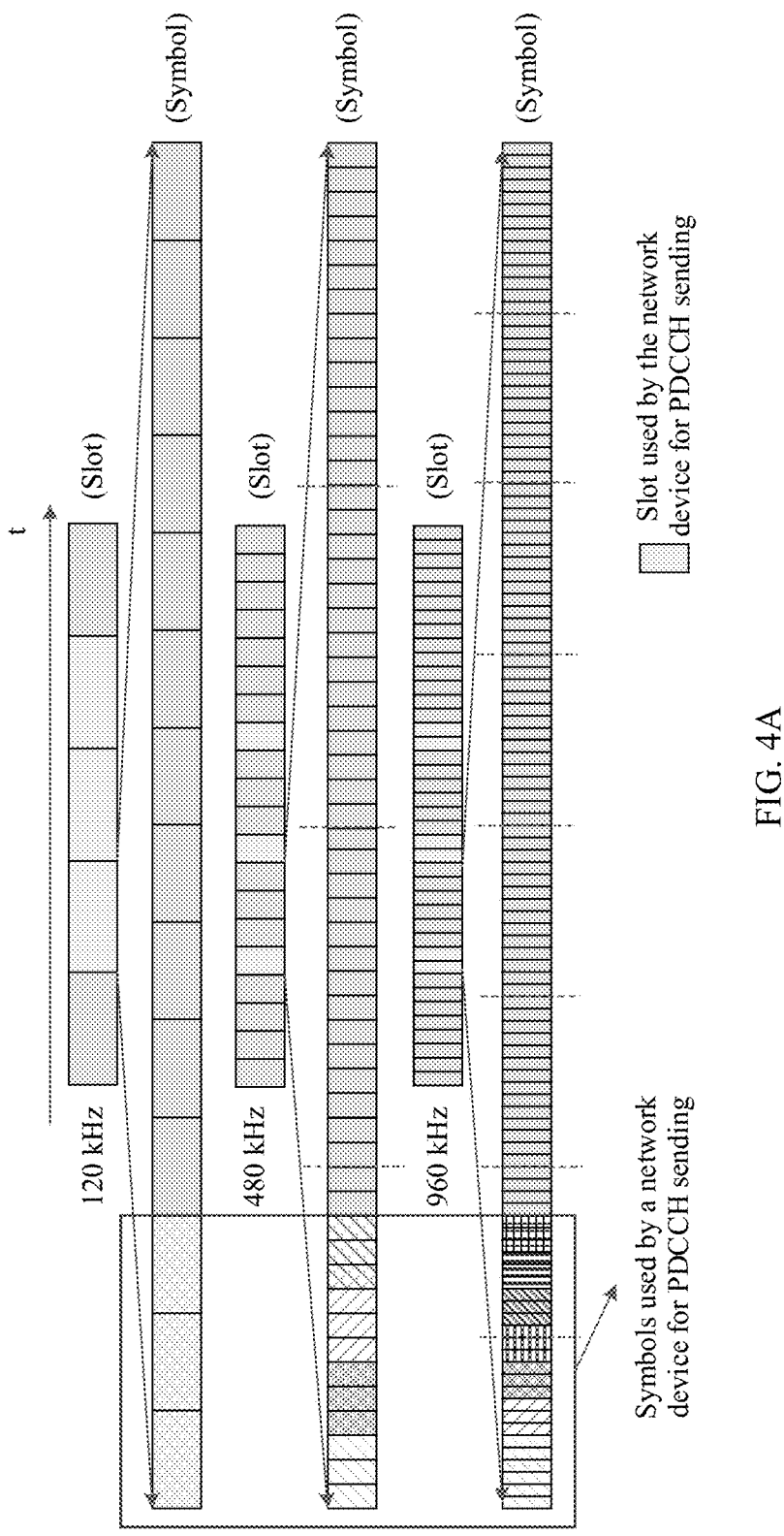
FIG. 4A is a schematic diagram of a PDCCH sending scenario according to an embodiment of this application.

This application provides a solution in which multi-slot scheduling can be better implemented, and an increase in complexity of monitoring a PDCCH by a terminal device can also be avoided. As shown in a schematic diagram of a scenario shown in FIG. 4A, in this application, in a scenario in which a network device needs to send a PDCCH to a plurality of terminal devices, the network device may group time domain resources used to send the PDCCH. Each time domain resource group may be used to carry a PDCCH corresponding to a group of users. In FIG. 4A, when a subcarrier spacing is greater than or equal to 480 kHz, in the time domain resources used by the network device for PDCCH sending, symbols with a same padding pattern are used to send the PDCCH to a group of terminal devices. In this way, a terminal device at a receive end may not need to perform monitoring on an entire time domain resource used to send the PDCCH in a configuration, and only needs to monitor the PDCCH on a time domain resource corresponding to a group, thereby avoiding an increase in complexity of PDCCH monitoring of the terminal device.

The following describes the technical solutions of this application with reference to a PDCCH transmission method in embodiments of this application.

Figures 4B, 5A:
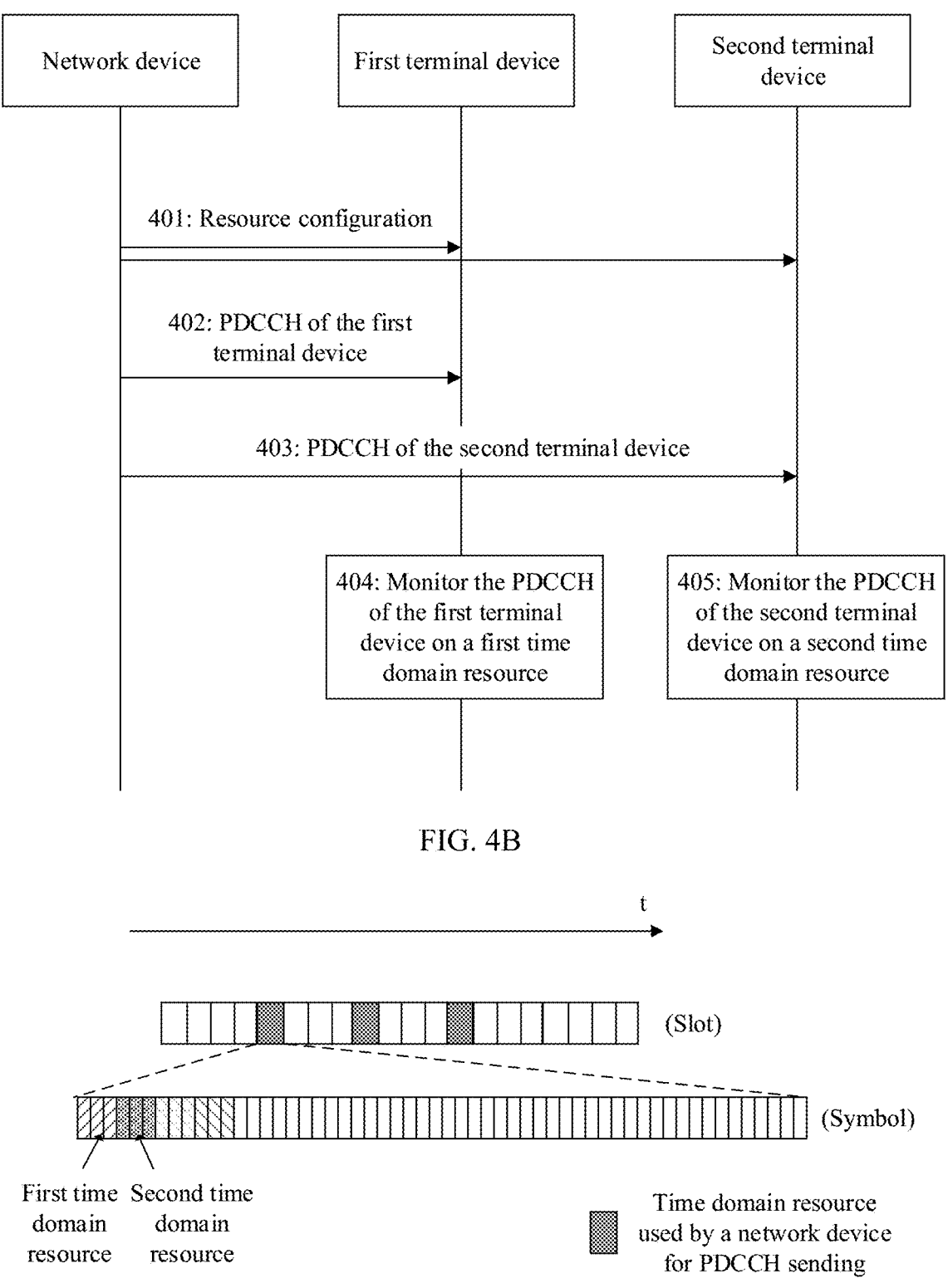
FIG. 4B is a schematic flowchart of a PDCCH transmission method according to an embodiment of this application.
FIG. 5A is a schematic diagram of another PDCCH sending scenario according to an embodiment of this application.

As shown in a schematic flowchart shown in FIG. 4B, the PDCCH transmission method in embodiments of this application may include the following steps.

401: A network device sends a resource configuration, where the resource configuration indicates a time domain resource used by the network device for PDCCH sending.

Correspondingly, a terminal device receives the resource configuration.

Specifically, the network device may send the resource configuration to a plurality of terminal devices, and each terminal device receives the resource configuration.

For example, the resource configuration may indicate a start symbol and a quantity of symbols of the time domain resource used by the network device for PDCCH sending.

The time domain resource used by the network device for PDCCH sending is a plurality of consecutive symbols.

402: The network device sends a PDCCH of a first terminal device on a first time domain resource in the time domain resource used by the network device for PDCCH sending.

403: The network device sends a PDCCH of a second terminal device on a second time domain resource in the time domain resource used by the network device for PDCCH sending.

The time domain resource used by the network device for PDCCH sending may be divided into a plurality of time domain resource groups, a plurality of time domain resource intervals, or a plurality of time domain resource ranges.

In this application, a time domain resource group, a time domain resource interval, or a time domain resource range may be understood as a time domain resource allocated to a group of terminal devices and used to send a PDCCH to the group of terminal devices. Alternatively, a time domain resource group, a time domain resource interval, or a time domain resource range may be understood as a time domain resource allocated to a group of terminal devices and used by the group of terminal devices for PDCCH monitoring.

In this application, PDCCH monitoring may also be understood as PDCCH detection, PDCCH blind detection, or the like.

The first time domain resource may also be understood as a first time domain resource group, and the second time domain resource may be understood as a second time domain resource group. The network device sends PDCCHs of some terminal devices on the first time domain resource, and sends PDCCHs of some other terminal devices on the second time domain resource. It may be understood that the first terminal device is any terminal device in the some terminal devices, and the second terminal device is any terminal device in the some other terminal devices.

It may also be understood that the network device also sends the PDCCH to the terminal device in a grouping manner. A plurality of terminal devices are divided into a plurality of user groups. The plurality of user groups include a first user group and a second user group. One user group may correspond to one time domain resource group. The network device sends, in each time domain resource group, a PDCCH to a terminal device in a user group corresponding to each time domain resource group. For example, the first time domain resource group corresponds to the first user group, and the second time domain resource group corresponds to the second user group. The network device sends a PDCCH of the first user group on the first time domain resource, and sends a PDCCH of the second user group on the second time domain resource.

In this way, the terminal device in each group needs to monitor the PDCCH only on a time domain resource corresponding to the user group to which the terminal device belongs, thereby reducing complexity of PDCCH monitoring of the terminal device.

It should be understood that, in this application, the time domain resource group and the user group are intended for ease of description, and it is not limited that there is definitely an actual time domain resource group and an actual user group. It may also be understood that a portion of the time domain resource is used to send PDCCHs of some terminal devices to the some terminal devices, and another portion of the time domain resource is used to send PDCCHs of some other terminal devices to the some other terminal devices.

Before step 402, the network device may map the PDCCH sent to the first terminal device to the first time domain resource, and map the PDCCH sent to the second terminal device to the second time domain resource.

404: The first terminal device monitors the PDCCH of the first terminal device on the first time domain resource.

In other words, the first terminal device blindly detects the PDCCH of the first terminal device on the first time domain resource.

The first time domain resource may be understood as a time domain resource used by the first terminal device to monitor the PDCCH.

A location of the first time domain resource may be sent by the network device to the first terminal device, or may be obtained by the first terminal device and the network device in an agreed manner.

405: The second terminal device monitors the PDCCH of the second terminal device on the second time domain resource.

In other words, the second terminal device blindly detects the PDCCH of the second terminal device on the second time domain resource.

The second time domain resource may be understood as a time domain resource used by the second terminal device to monitor the PDCCH.

A location of the second time domain resource may be sent by the network device to the second terminal device, or may be obtained by the second terminal device and the network device in an agreed manner.

Step 404 and step 405 may also be understood as that the terminal device monitors the PDCCH on a portion of the time domain resource used to transmit the PDCCH.

According to the technical solution in this application, time domain resources used for PDCCH sending are grouped. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

As shown in a schematic diagram of a scenario shown in FIG. 5A, in a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

Figure 5B:
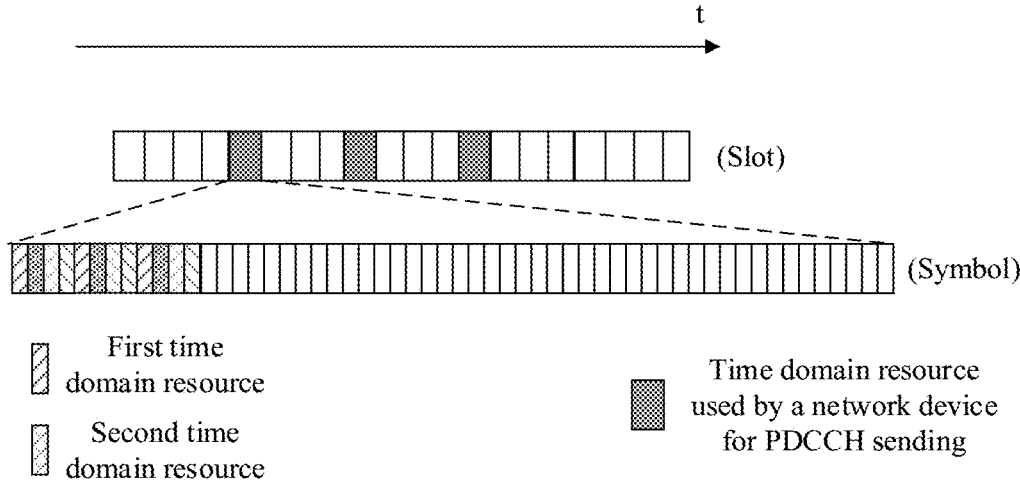
FIG. 5B is a schematic diagram of another PDCCH sending scenario according to an embodiment of this application.

As shown in a schematic diagram of a scenario shown in FIG. 5B, in another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

It should be understood that, in some cases, symbols of some time domain resource groups may be consecutive, and symbols of some other time domain resource groups are separated.

The location of the first time domain resource may be sent by the network device to the first terminal device, or may be obtained by the first terminal device and the network device in an agreed manner.

For ease of description, a solution in which the network device sends the resource configuration to the terminal device in an implementation is first provided.

In an implementation, the network device sends search space and a control-resource set (CORESET) to the terminal device.

A monitoring slot periodicity and offset monitoringSlot-PeriodicityAndOffset field in the search space indicates a periodicity and an offset, duration (duration) indicates a quantity of slots in which monitoring needs to be consecutively performed in one periodicity, and a specific slot for transmitting the PDCCH may be determined by using the two fields.

A monitoring symbols within slot monitoringSymbolsWithinSlot field in the search space indicates a start symbol of the time domain resource used to transmit the PDCCH in each slot (in other words, a PDCCH-monitoring span) for transmitting the PDCCH. A length of the monitoring symbols within slot monitoringSymbolsWithinSlot field is 14 bits, and an $i^{th}$ bit corresponds to an $i^{th}$ symbol in the slot. In other words, each bit corresponds to one symbol in the slot. If an $m^{th}$ bit is 1, it indicates that an $m^{th}$ symbol is the start symbol of the time domain resource used to transmit the PDCCH in the slot. For example, if a fifth bit of monitoringSymbolsWithinSlot field is 1, it indicates that a fifth symbol (a symbol 4) is the start symbol of the time domain resource used to transmit the PDCCH.

A control resource set identifier controlResourceSetId field in the search space is used to associate the search space with the CORESET, and a duration field in the associated CORESET indicates a quantity of symbols of the time domain resource used to transmit the PDCCH in the slot.

The method may also be used to determine a location of a monitoring span in this solution. To be specific, the monitoringSlotPeriodicityAndOffset field in the search space indicates the periodicity and the offset, and the duration field indicates a total quantity of slots included in a monitoring span in which monitoring needs to be consecutively performed in one periodicity (corresponding to $T_s=3$ changing to $T_s=12$ or $T_s=24$ in the foregoing example). A specific monitoring span for transmitting the PDCCH may be determined by using the two fields.

It should be understood that the first time domain resource is any one of the plurality of time domain resource groups, and the second time domain resource is any one of the plurality of time domain resource groups that is different from the first time domain resource.

The first terminal device is any terminal device in the first user group corresponding to the first time domain resource. The second terminal device is any terminal device in the second user group corresponding to the second time domain resource.

In this application, a solution related to the first time domain resource is also applicable to the second time domain resource. The second time domain resource is not repeatedly described in this application.

The following describes a solution, provided in this application, in which the network device configures the first time domain resource when the network device sends the location of the first time domain resource to the first terminal device.

In some implementations, the resource configuration includes a first time domain resource configuration, and the first time domain resource configuration includes a start symbol of the first time domain resource and a quantity of symbols of the first time domain resource. The start symbol of the first time domain resource may be a start symbol of the first time domain resource in a PDCCH-monitoring span. In this way, the first terminal device can accurately obtain the location of the first time domain resource based on the resource configuration sent by the network device, so as to perform blind detection on or receive a PDSCH on the first time domain resource.

Specifically, the resource configuration may be carried in the search space and/or the control-resource set (CORESET). For example, the network device sends the search space and the CORESET to the terminal device, and the search space and/or the CORESET include/includes the resource configuration.

In a possible implementation, a configuration of the start symbol of the first time domain resource is carried in a first field in the search space, a quantity of symbols of the first field is $14 \times S_{max}$, and $S_{max}$ is a maximum quantity of slots included in a PDCCH-monitoring span. For example, if an allowed maximum subcarrier spacing is 960 KHz, $S_{max}$ is a quantity 8 of slots included in a PDCCH-monitoring span when the subcarrier spacing is 960 KHz. The first field may be, for example, a PDCCH-monitoring start location indication (monitoringSymbolsWithinTimeUnit) field corresponding to all symbols in a time unit or a monitoring span obtained by extending a range corresponding to the monitoring symbols within slot (monitoring symbols within slot) field. It should be understood that the first field may have another name. A name of the first field is not limited in this application. The duration (duration) field in the CORESET associated with the search space indicates the quantity of symbols of the first time domain resource.

For example, if the maximum quantity $S_{max}$ of slots included in the PDCCH-monitoring span is 4, the quantity of symbols of the first field is $14 \times 4 = 56$.

In a monitoring periodicity, the terminal device monitors the PDCCH once in S slots (one monitoring span) in $T_s$ consecutive slots, symbols for monitoring the PDCCH in the S slots are $S \times D$ consecutive symbols, and D is a quantity of consecutive symbols configured for the CORESET associated with the search space, namely, a value of the duration field. When the SCS is 120 KHz, S is 1.

In an example, $S = 2^{\mu - \mu_0}$, and $\mu_0$ is an index corresponding to a reference SCS. For example, if the reference SCS is 120 kHz, $\mu_0$ is 3. $\mu$ is an index corresponding to a subcarrier spacing of the PDCCH. In this application, an example in which $\mu_0$ is 3 is used for description, but $\mu_0$ is not limited to 3.

For example, when the SCS is 480 kHz, $\mu = 5$, and in this case, S=4. When the SCS is 960 kHz, $\mu = 6$, and in this case, S=8. In this way, when the SCS is increased, in each monitoring span, absolute duration occupied by the quantity of symbols used by the network device to transmit the PDCCH can keep basically identical with or the same as absolute duration occupied by the quantity of symbols used by the network device to transmit the PDCCH in a same configuration when the SCS is 120 KHz.

A time unit (time unit) or a monitoring span corresponding to the monitoringSymbolsWithinTimeUnit field may be defined as a slot length used when the SCS is 120 KHz. The time unit may alternatively be changed to a similar meaning such as a slot unit, multiple slots (xslots), a span, or a window. Alternatively, a unit of the time unit may be a slot length of an SCS based on another value or an absolute time length.

Figure 6A:
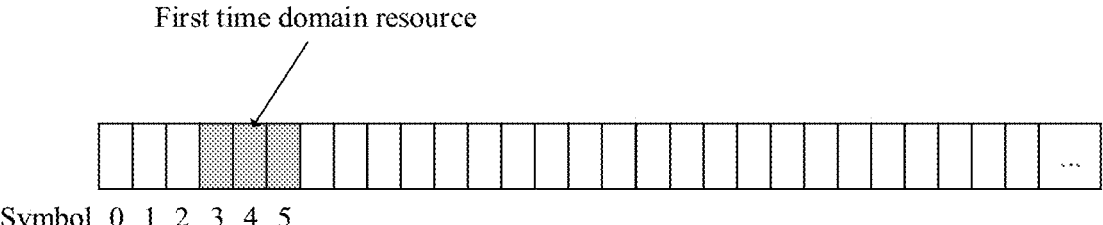
FIG. 6A is a schematic diagram of another PDCCH sending scenario according to an embodiment of this application.

For example, in a schematic diagram of a scenario shown in FIG. 6A, the first field in the search space sent to the first terminal device is [0, 0, 0, 1, 0, 0, . . . ], and a total length is 112 bits. If the duration field in the associated CORESET indicates 3, it indicates that the start symbol of the first time domain resource in the time domain resource used by the network device for PDCCH sending is a fourth symbol in the monitoring span, and the quantity of symbols is 3. In other words, the first time domain resource is fourth to sixth symbols or symbols 3 to 5 (symbol numbers start from 0) in the plurality of slots in the time domain resource used to transmit the PDCCH. The first terminal device monitors the PDCCH on the symbols 3 to 5 in the monitoring span.

Figure 6B:
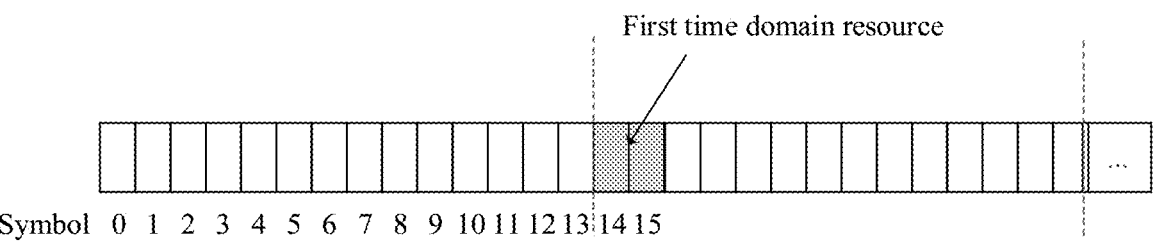
FIG. 6B is a schematic diagram of another PDCCH sending scenario according to an embodiment of this application.

For another example, in a schematic diagram of a scenario shown in FIG. 6B, in an example 2, the first field in the search space sent to the first terminal device is [0, 0, 0, 0, 0, 0, 0, 0, 0, 0, 0, 0, 0, 0, 1, 0, . . . ], and a total length is 112 bits. If the duration field in the associated CORESET indicates 2, it indicates that the start symbol of the first time domain resource in the time domain resource used by the network device for PDCCH sending is a fifteenth symbol in the monitoring span, and the quantity of symbols of the first time domain resource is 2. In other words, when the first time domain resource is consecutive, the first time domain resource is fifteenth and sixteenth symbols in the plurality of slots or the monitoring span in the time domain resource used to transmit the PDCCH, or symbols 14 and 15 (symbol numbers start from 0) in the monitoring span, and corresponds to symbols 0 and 1 in a second slot in the monitoring span. The first terminal device monitors the PDCCH on the symbols 14 and 15 in the monitoring span.

In this way, the network device can indicate an absolute location of the first time domain resource to the first terminal device, and flexibility of the location of the first time domain resource is high. In addition, the terminal device may not need to obtain a location of a total time domain resource used by the network device for PDCCH sending, so that overheads of related signaling messages that indicate the total time domain resource used by the network device for PDCCH sending can be reduced.

It should be understood that, in this solution, the resource configuration may not include a configuration of the time domain resource used by the network device for PDCCH sending. In other words, in this solution, the steps of the PDCCH transmission method may include the following steps.

The network device sends a resource configuration, where the resource configuration includes a first time domain resource configuration and a second time domain resource configuration, the first time domain resource configuration indicates the first time domain resource, and the second time domain resource configuration indicates the second time domain resource.

The network device sends the PDCCH to the first terminal device on the first time domain resource, and sends the PDCCH to the second terminal device on the second time domain resource.

The first network device sends the PDCCH to the first terminal device on the first time domain resource, and sends the PDCCH to the second terminal device on the second time domain resource.

In this solution, when the quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

In another possible implementation, a first symbol of the first time domain resource is a start symbol of a slot, a configuration of the start symbol of the first time domain resource is carried in a second field in the search space. The second field may indicate the start symbol of the first time domain resource by indicating a location of a slot in which the first time domain resource is located in the time domain resource used by the network device for PDCCH sending. A length of the second field is $S_{max}$, and $S_{max}$ is a maximum quantity of slots included in a PDCCH-monitoring span. The second field may be referred to as a monitoring symbols within time unit monitoringSymbolsWithinTimeUnit field or a monitoring slots within time unit monitoringSlotsWithinTimeUnit field. In this solution, the first symbol of the first time domain resource can be limited to only a first symbol of a slot. In this case, the second field only needs to indicate the location of the slot in which the first time domain resource is located in the time domain resource used by the network device for PDCCH sending, to increase an indication granularity and shorten the length of the field indicating the configuration of the start symbol of the first time domain resource, thereby helping reduce signaling overheads.

For example, $S_{max}$=8. The second field in the search space sent to the first terminal device is [1, 0, 0, 0, 0, 0, 0, 0]. If the duration field in the CORESET associated with the search space indicates 3, it indicates that the start symbol of the first time domain resource is a first symbol of a first slot in the time domain resource used by the network device for PDCCH sending, and the quantity of symbols is 3. In other words, in a scenario in which the symbols of the first time domain resource are consecutive, the first time domain resource is first to third symbols or symbols 0 to 2 (symbol numbers start from 0) of the first slot of the time domain resource used to transmit the PDCCH. The terminal device monitors the PDCCH on the symbols 0 to 2 of the first slot of the time domain resource used to transmit the PDCCH. In a scenario in which the symbols of the first time domain resource are separated, when $S_{max}$=8, the first time domain resource is the first symbol and a ninth symbol of the first slot and a third symbol of a second slot of the time domain resource used to transmit the PDCCH, or symbols 0 and 8 of the first slot and a symbol 2 of the second slot (symbol numbers start from 0). The first terminal device monitors the PDCCH on the symbols 0 and 8 of the first slot and the symbol 2 of the second slot of the time domain resource used to transmit the PDCCH.

For another example, $S_{max}$=8. The second field in the search space sent to the first terminal device is [0, 1, 0, 0, 0, 0, 0, 0]. If the duration field in the CORESET associated with the search space indicates 2, it indicates that the start symbol of the first time domain resource is a first symbol of a second slot of the time domain resource used by the network device for PDCCH sending, and the quantity of symbols is 2. In other words, in a scenario in which the symbols of the first time domain resource are consecutive, the first time domain resource is first and second symbols or symbols 0 and 1 (symbol numbers start from 0) of the second slot of the time domain resource used to transmit the PDCCH. The terminal device monitors the PDCCH on the symbols 0 and 1 of the second slot of the time domain resource used to transmit the PDCCH. This corresponds to monitoring the PDCCH on symbols 14 and 15 in a PDCCH-monitoring span. In a scenario in which the symbols of the first time domain resource are separated, when $S_{max}$=8, the first time domain resource is the first symbol and a ninth symbol of the second slot of the time domain resource used to transmit the PDCCH, or symbols 0 and 8 of the second slot (symbol numbers start from 0). The first terminal device monitors the PDCCH on the symbols 0 and 8 of the second slot of the time domain resource used to transmit the PDCCH.

In another possible implementation, the first time domain resource configuration includes an offset corresponding to the first time domain resource, and the offset indicates a location of the start symbol of the first time domain resource in the time domain resource used by the network device for PDCCH sending. In other words, the network device indicates the start symbol of the first time domain resource by indicating the offset. The offset corresponding to the first time domain resource may be understood as a quantity of offset symbols of the start symbol of the first time domain resource relative to a first symbol of the time domain resource used by the network device for PDCCH sending.

In some embodiments, the search space includes a third field indicating the offset. In this way, the third field indicates the offset, so that the terminal device can more directly obtain the offset corresponding to the first time domain resource, so as to obtain the location of the start symbol of the first time domain resource.

The third field may be referred to as a time offset index within one detection timeOffsetIndexWithinOneDetection field, a time offset index within span timeOffsetIndexWithinSpan field, a time offset within span timeOffsetWithinSpan field, a symbol offset within span symbolOffsetWithinSpan field, or a symbol offset index within span symbolOffsetIndexWithinSpan field. Certainly, in another embodiment, the third field may alternatively have another name. A name of the third field is not limited in this application.

Specifically, the search space further includes a field indicating the start symbol of the time domain resource used by the network device for PDCCH sending. For example, the monitoring symbols within time unit field in the search space indicates the start symbol of the time domain resource used by the network device for PDCCH sending. A length of the monitoring symbols within time unit field may be 14, and indication is performed by using S symbols as a granularity. It may be understood that the S symbols are used as a symbol unit or a symbol set for indication. For example, the monitoring symbols within time unit field may indicate, by configuring a bit i to 1, that the start symbol of the time domain resource used by the network device for PDCCH sending is a symbol i×S (an $(i×S+1)^{th}$ symbol). For another example, the monitoring symbols within time unit field is a bitmap, and when an $i^{th}$ bit of the monitoring symbols within time unit field is 1, it indicates that the start symbol of the time domain resource used by the network device for PDCCH sending is a symbol $i \times S$. The field of the start symbol of the time domain resource used by the network device for PDCCH sending may alternatively be referred to as one of a monitoring symbols unit within time unit (monitoring symbols unit within time unit) field, a monitoring symbols set within time unit (monitoring symbols set within time unit) field, or a monitoring symbols group within time unit (monitoring symbols group within time unit) field.

The third field in the search space indicates a start symbol, in the time domain resource used by the network device for PDCCH sending, of the start symbol of the first time domain resource. The duration field in the CORESET indicates the quantity of symbols of the first time domain resource.

In an embodiment, the third field may be combined with the duration field to indicate the offset corresponding to the first time domain resource.

For example, a value indicated by the third field is $O_{in}$. In a scenario in which the symbols of the first time domain resource are consecutive, the offset corresponding to the first time domain resource in the time domain resource used by the network device for PDCCH sending is $O_{in} \times D$. In other words, the start symbol of the first time domain resource is an $(O_{in} \times D + 1)^{th}$ symbol in the time domain resource used by the network device for PDCCH sending. D is a value indicated by the duration field. A value of $O_{in}$ ranges from 0 to $S_{max} - 1$. In a scenario in which the symbols of the first time domain resource are separated, the offset corresponding to the first time domain resource in the time domain resource used by the network device for PDCCH sending is $O_{in}$. In other words, the start symbol of the first time domain resource is an $(O_{in} + 1)^{th}$ symbol in the time domain resource used by the network device for PDCCH sending. D is a value indicated by the duration field. A value of $O_{in}$ ranges from 0 to $S_{max} - 1$.

In this way, the first terminal device can obtain, based on the field that is in the search space and that indicates the start symbol of the time domain resource used by the network device for PDCCH sending, the start symbol of the time domain resource used by the network device for PDCCH sending: determine the start symbol, in the time domain resource used by the network device for PDCCH sending, of the start symbol of the first time domain resource based on the third field and the duration field in the CORESET; and determine the quantity of symbols of the first time domain resource based on the duration field in the CORESET, so as to determine the location of the first time domain resource in the time domain resource used by the network device for PDCCH sending.

Optionally, the duration field in the CORESET may further indicate a quantity $Q = D \times S$ of symbols of the time domain resource used by the network device for PDCCH sending. D is the value indicated by the duration field. In this solution, in the time domain resource used by the network device for PDCCH sending, a quantity of symbols of a time domain resource in each group is the same.

For example, in a schematic diagram of a scenario shown in FIG. 7A, when the SCS is 480 kHz, S=4, and the symbols of the first time domain resource are consecutive, if the monitoringSymbolsWithinTimeUnit field is [1, 0, 0, 0, 0, 0, 0, 0, 0, 0, 0, 0, 0, 0], the duration field indicates 2 (in other words, D=2), and the third field indicates 3, it indicates that an offset of the start symbol of the time domain resource used by the network device for PDCCH sending in the monitoring span is 0 symbol (symbol 0), the quantity of symbols of the time domain resource used by the network device for PDCCH sending is $2 \times 4 = 8$, and an offset corresponding to the first time domain resource in a PDCCH-monitoring span is $3 \times 2 = 6$. In other words, the start symbol of the first time domain resource is a seventh symbol in the time domain resource used by the network device for PDCCH sending, and the quantity of symbols of the first time domain resource is 2. In other words, the first time domain resource is seventh and eighth symbols (symbols 6 and 7) in the time domain resource used by the network device for PDCCH sending. The first terminal device monitors the PDCCH on the seventh and eighth symbols in the time domain resource used by the network device for PDCCH sending.

For another example, in a schematic diagram of a scenario shown in FIG. 7B, when the SCS is 480 kHz, S=4, and the symbols of the first time domain resource are consecutive, if the monitoringSymbolsWithinTimeUnit field is [0, 0, 1, 0, 0, 0, 0, 0, 0, 0, 0, 0, 0, 0], the duration field indicates 3 (in other words, D=3), and the third field indicates 1, it indicates that an offset of the start symbol of the time domain resource used by the network device for PDCCH sending is an $(2 \times 4 = 8)^{th}$ symbol, the quantity of symbols of the time domain resource used by the network device for PDCCH sending is 3, and the offset of the first time domain resource in the time domain resource used by the network device for PDCCH sending is $1 \times 3 = 3$. In other words, the start symbol of the first time domain resource is a fourth symbol in the time domain resource used by the network device for PDCCH sending, and the quantity of symbols of the first time domain resource is 3. In other words, the first time domain resource is fourth to sixth symbols in the time domain resource used by the network device for PDCCH sending, and corresponds to the symbols 14 and 15 in the monitoring span. The first terminal device monitors the PDCCH on the fourth to sixth symbols in the time domain resource used by the network device for PDCCH sending.

In some other embodiments, the CORESET includes a field indicating the offset.

In this solution, the field indicating the offset can indirectly indicate the start symbol of the first time domain resource, or indicate the start symbol of the first time domain resource in the time domain resource used by the network device for PDCCH sending. The CORESET also includes a duration field, and a meaning of the duration field is the same as that of the duration field in the foregoing embodiment in which the search space includes the field indicating the offset.

In an example, the network device may configure an associated CORESET number for the search space. The first terminal device can obtain the associated CORESET number based on the search space, and obtain a corresponding CORESET field based on the CORESET number, to obtain the location of the first time domain resource based on the CORESET field, so as to receive the PDCCH on the first time domain resource. Different CORESET numbers correspond to different offsets, and different CORESET numbers may correspond to a same duration field and/or a same frequency domain location.

In another example, the search space includes a first CORESET set associated with the search space, the first CORESET set includes the offset, and the CORESET includes a field indicating a number of the first CORESET set. Specifically, the network device may configure the number of the associated first CORESET set for the search space, and the network device and the first terminal device determine, in the first CORESET set based on a downlink control information (DCI) configuration or according to a predefined rule, a CORESET number corresponding to the first terminal device. For example, numbers of CORESETs included in a CORESET set whose number is p are {p×S, p×S+1, . . . , p×S+S−1}, and the CORESETs in the CORESET set have a same duration field and a same frequency domain location. Then, the first terminal device determines, based on the CORESET number corresponding to the first terminal device, a CORESET field corresponding to the first terminal device, to obtain the location of the first time domain resource, and receive the PDCCH on the first time domain resource.

The following specifically describes a solution in which the terminal device obtains the first time domain resource in a manner agreed with the network device.

In some embodiments, the first time domain resource is determined based on one or more of an identifier (ID) of the first terminal device, a slot index, and a quantity of monitoring times in a current periodicity. The network device and the first terminal device determine, based on one or more of the identifier (ID) of the first terminal device, the slot index, or the quantity of monitoring times in the current periodicity, the location of the first time domain resource in the time domain resource used by the network device for PDCCH sending.

Specifically, the network device and the first terminal device determine, based on a field that is included in the search space and/or the CORESET and that indicates the time domain resource used by the network device for PDCCH sending, locations of Q consecutive symbols of the time domain resource used by the network device for PDCCH sending.

Then, the network device and the first terminal device determine an offset in the Q consecutive symbols based on one or more of the identifier (ID) of the first terminal device, the slot index, or the quantity of monitoring times in the current periodicity.

The network device may group a plurality of terminal devices based on identifiers of the plurality of terminal devices, and divide the plurality of terminal devices into a plurality of user groups, where each user group corresponds to a different offset; and determine, based on the offset of each user group, a location of a time domain resource corresponding to each user group in the time domain resource used by the network device for PDCCH sending. The first terminal device determines, based on the field in the search space and/or the CORESET, the time domain resource used by the network device for PDCCH sending: determines, based on the identifier of the first terminal device, an offset of a group to which the first terminal device belongs in the Q consecutive symbols; and determines, based on the offset, a location of a time domain resource corresponding to the user group to which the first terminal device belongs in the time domain resource used by the network device for PDCCH sending.

The offset may be determined in one of the following manners.

For example, the offset may be determined based on the identifier of the terminal device, where the offset is $O_{sym}=\text{mod}(ID, S) \times D$. D is the value indicated by the duration field in the CORESET.

For another example, the offset may be determined based on the identifier of the terminal device and a quantity $k_{dec}$ of monitoring times in the current periodicity, where the offset is $O_{sym}=\text{mod}(ID+k_{dec}, S) \times D$. This manner is used as an example. Specifically, for example, the SCS is 480 kHz, S=4, D=2, and the time domain resource used by the network device for PDCCH sending is a symbol 0 to a symbol 7. A relationship between the offset, the ID, and the $k_{dec}$ is shown in Table I below:

TABLE 1

| ID | $k_{dec} = 0$ | $k_{dec} = 1$ | $k_{dec} = 2$ | $k_{dec} = 3$ |
|---|---|---|---|---|
| 0 | 0 <=> {0, 1} | 2 <=> {2, 3} | 4 <=> {4, 5} | 6 <=> {6, 7} |
| 1 | 2 <=> {2, 3} | 4 <=> {4, 5} | 6 <=> {6, 7} | 0 <=> {0, 1} |
| 2 | 4 <=> {4, 5} | 6 <=> {6, 7} | 0 <=> {0, 1} | 2 <=> {2, 3} |
| 3 | 6 <=> {6, 7} | 0 <=> {0, 1} | 2 <=> {2, 3} | 4 <=> {4, 5} |

In Table 1, a value on the left of "<=>" is the offset, and a value on the right is a symbol number (relative to a number in the Q symbols) of a time domain resource used by the terminal device for PDCCH monitoring when the symbols of the first time domain resource are consecutive.

For example, if the ID corresponding to the first terminal device is 0, and $k_{dec}$ is 0, the offset is 0, and the first time domain resource is a symbol 0 and a symbol 1 in the Q symbols used by the network device for PDCCH sending. In other words, the time domain resource used by the first terminal device to monitor the PDCCH is the symbol 0 and the symbol 1 in the Q symbols. If the ID corresponding to the first terminal device is 1, and $k_{dec}$ is 1, the offset is 4, and the first time domain resource is a symbol 4 and a symbol 5 in the Q symbols used by the network device for PDCCH sending. In other words, the time domain resource used by the first terminal device to monitor the PDCCH is the symbol 4 and the symbol 5 in the Q symbols.

Certainly, Table 1 is merely used as an example, and does not constitute a limitation on this application. In another embodiment, values of the SCS, S, and D may alternatively be other values.

The network device and the first terminal device may alternatively select an offset from an offset value set according to an agreed rule. Optionally, a quantity of elements in the offset value set may be related to a quantity of terminal devices served by the network device. A larger quantity of terminal devices served by the network device indicates a larger quantity of elements in the offset value set, and a smaller quantity of terminal devices served by the network device indicates a smaller quantity of elements in the offset value set.

In some optional embodiments, the network device and the first terminal device may determine the location of the first time domain resource based on a control channel element (CCE) offset.

For example, a CCE group or a CCE set may be defined, and each CCE group is separately numbered. Different CCE groups or different CCE sets have a same CCE number, and different CCE groups or different CCE sets correspond to different time domain offsets. In other words, the offsets are related to numbers of the CCE groups or numbers of the CCE sets. For example, numbers of a CCE group 1 (for example, first three columns in FIG. 8A) are defined as 0 to $N_{cce}-1$ (numbers 0 to 11 in the first three columns in FIG. 8A), numbers of a CCE group 2 are defined as 0 to $N_{cce}-1$ (numbers 0 to 11 in columns 4 to 6 in FIG. 8A), and the like.

The network device may indicate a number of the CCE group or a number of the CCE set by using a newly defined field in the CORESET, or may determine a number of the CCE group or a number of the CCE set based on the ID.

The first terminal device and the network device determine a start location of the first time domain resource in the Q consecutive symbols based on the determined number of the CCE group or the determined number of the CCE set, and determine the quantity of symbols of the first time domain resource based on the duration field in the CORESET.

For example, the duration field in the CORESET indicates 3. As shown in FIG. 8A, in a diagram of a correspondence between offset values and CCE numbers, every three columns correspond to one offset value. After CCEs with a same offset value are numbered, CCEs with a next offset value are numbered.

For another example, a CCE group or a CCE set may be defined, and a plurality of CCE groups are consecutively numbered. For example, numbers of a CCE group 1 (for example, first three columns in FIG. 8B) are defined as 0 to $N_{cce}-1$ (numbers 0 to 11 in the first three columns in FIG. 8B), numbers of a CCE group 2 (for example, fourth to sixth columns in FIG. 8B) are defined as $N_{cce}$ to $2N_{cce}-1$ (numbers 12 to 23 in the first three columns in FIG. 8B), and the like. Different CCE groups have different time domain offsets. In this way, the first terminal device may determine a start location of the first time domain resource in the Q consecutive symbols based on a CCE number offset or a CCE number start value, and determine the quantity of symbols of the first time domain resource based on the duration of the CORESET.

The CCE number offset or the CCE number start value is indicated by the network device. Alternatively, the first terminal device determines a number of a CCE in the CORESET based on the ID: determines, based on the number of the CCE, the start location of the first time domain resource in the Q consecutive symbols used to transmit the PDCCH; and determines the quantity of symbols of the first time domain resource based on the duration field in the CORESET.

As shown in FIG. 8B, in a diagram of a correspondence between offset values and CCE numbers, every three columns correspond to one offset value. For a specified terminal device, a CCE number introduces an overall offset. If all CCEs with a same offset value are defined as a CCE group or a CCE set, CCE interleaving, resource element group (REG) binding, and the like are allowed only in the CCE group or the CCE set.

The CCE offset may be determined based on one or more of the identifier (ID) of the terminal device, the slot index, or the quantity of monitoring times in the current periodicity.

In some embodiments, an offset $O_{cce}$ may be determined based on the ID. Specifically, $O_{cce}=\text{mod}(ID, S)\times N_{cce}$. $N_{cce}$ is a quantity of CCEs in a CCE set or a CCE group, and may be determined based on a configuration of the CORESET.

In some other embodiments, an offset $O_{cce}$ may be determined based on the ID and the quantity of monitoring times in the current periodicity. Specifically, $O_{cce}=\text{mod}(ID+k_{dec}, S)\times N_{cce}$.

The following provides some solutions for grouping time domain resources used by the network device for PDCCH sending. The following solution may be applied to a scenario in which the symbols of the first time domain resource are consecutive.

Figure 9A:
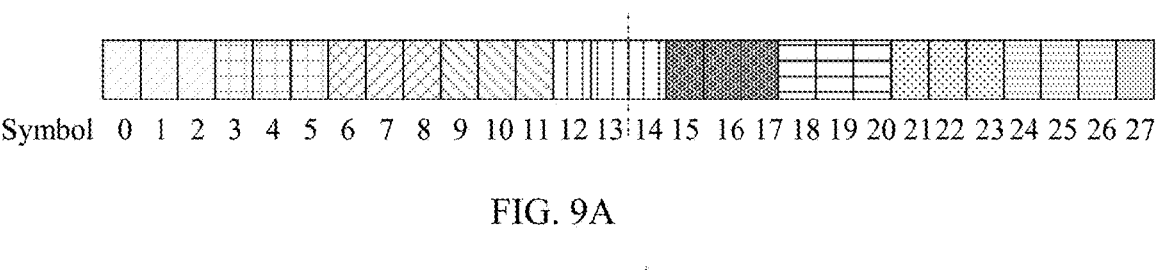
FIG. 9A is a schematic diagram of another PDCCH sending scenario according to an embodiment of this application.

In a schematic diagram of a scenario shown in FIG. 9A, if the first time domain resource indicated by the resource configuration is a symbol 12 to a symbol 14, the symbols of the first time domain resource crosses two slots, the symbol 12 and the symbol 13 belong to a first slot, and the symbol 14 belongs to a second slot.

In a grouping solution provided in this application, cross-slot grouping is not performed. In other words, symbols of one time domain resource group are in one slot. In this embodiment of this application, the symbols of the first time domain resource are in a same slot, and the symbols of the second time domain resource are in a same slot.

In some embodiments, quantities of symbols in all time domain resource groups may be the same or may be different.

For example, a PDCCH-monitoring span in which the time domain resource used by the network device for PDCCH sending is located includes a total of S slots (S>1), that is, a total of S×14 symbols. A definition of S is the same as that in the foregoing embodiment, and details are not described herein again. The time domain resource used by the network device for PDCCH sending occupies D×S symbols, where D is a quantity of consecutive symbols configured for the CORESET associated with the search space. The S×D symbols may be grouped into S time domain resource groups in an even grouping manner. Therefore, when S×D is greater than 14, if mod(14, D) is not 0, a group may cross slots. As shown in FIG. 9A, when D=3, symbols 12 to 14 of a fifth time domain resource group in a PDCCH-monitoring span belong to two slots, where the symbol 12 and the symbol 13 belong to a first slot, and the symbol 14 belongs to a second slot. Based on this case, this application provides some grouping policies for avoiding cross-time-domain grouping.

Figure 9B:
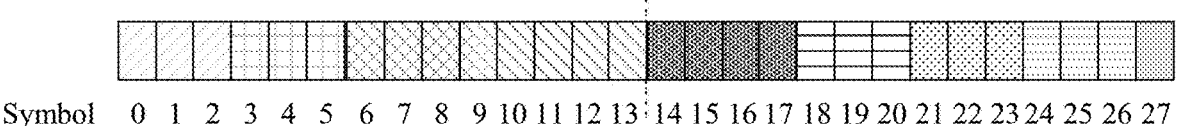
FIG. 9B is a schematic diagram of another PDCCH sending scenario according to an embodiment of this application.

In an example, if symbols of one time domain resource group are in two slots, the slots are used as boundaries, symbols in one slot and one or more time domain resource groups that are closest to the time domain resource group and that are in the same slot are combined, and one symbol is added to each combined time domain resource group. In a schematic diagram of a scenario shown in FIG. 9B, a symbol 12 and a symbol 13 are located in one slot, and a symbol 14 is located in another slot. In this case, one symbol may be added to a time domain resource group that originally includes symbols 6 to 8, and the time domain resource group is changed to include symbols 6 to 9. One symbol may be added to a time domain resource group that originally includes symbols 9 to 11, and the time domain resource group is changed to include symbols 10 to 13. One symbol may be added to a time domain resource group that originally includes symbols 15 to 18, and the time domain resource group is changed to include symbols 14 to 18. According to the grouping policy, the two slots of the time domain resource used by the network device for PDCCH sending are grouped, and quantities of symbols in obtained seven time domain resource groups are respectively 3, 3, 4, 4, 4, 3, and 3.

Figure 9C:
FIG. 9C is a schematic diagram of another PDCCH sending scenario according to an embodiment of this application.

In another example, if symbols of one time domain resource group are in two slots, the slots are used as boundaries, and symbols in one slot and a time domain resource group that is closest to the time domain resource group and that is in the same slot are combined. In a schematic diagram of a scenario shown in FIG. 9C, a symbol 12 and a symbol 13 are located in one slot, and a symbol 14 is located in another slot. In this case, two symbols may be added to a time domain resource group that originally includes symbols 9 to 11, and the time domain resource group is changed to include symbols 9 to 13. One symbol may be added to a time domain resource group that originally includes symbols 15 to 18, and the time domain resource group is changed to include symbols 14 to 18. According to the grouping policy, the two slots of the time domain resource used by the network device for PDCCH sending are grouped, and quantities of symbols in obtained seven time domain resource groups are respectively 3, 3, 3, 5, 4, 3, and 3.

In another example, if symbols of one time domain resource group are in two slots, the time domain resource group is split into two time domain resource groups by using the slots as boundaries. If a difference between a quantity of symbols included in a time domain resource group obtained through splitting and a quantity of symbols included in the original time domain resource group is greater than a specified threshold (for example, the specified threshold is 1), that is, when the original time domain resource group includes three symbols, and the time domain resource group obtained through splitting includes only one symbol, one symbol in an adjacent time domain resource group is combined into the time domain resource group obtained after splitting.

Figure 9D:
FIG. 9D is a schematic diagram of another PDCCH sending scenario according to an embodiment of this application.

In a schematic diagram of a scenario shown in FIG. 9D, a symbol 12 and a symbol 13 are located in one slot, and a symbol 14 is located in another slot. In this case, the symbol 12 and the symbol 13 are used as a time domain resource group, and the symbol 14 and a symbol 15 are used as a time domain resource group. A time domain resource group that originally includes symbols 15 to 17 is changed to include symbols 16 and 17. According to the grouping policy, the two slots of the time domain resource used by the network device for PDCCH sending are grouped, and quantities of symbols in obtained nine time domain resource groups are respectively 3, 3, 3, 3, 2, 2, 2, 3, and 3. According to the method, a difference between quantities of symbols in groups obtained through regrouping may be less than or equal to a specified threshold. It should be understood that the specified threshold is not limited to 1, and may alternatively be another value.

In another grouping solution provided in this application, a quantity of symbols of a time domain resource group is positively correlated with an aggregation level corresponding to the time domain resource group. In other words, the quantity of symbols of the first time domain resource is positively correlated with an aggregation level corresponding to the first time domain resource.

The network device may select an appropriate aggregation level based on a channel condition of the terminal device. In this way, the network device and the terminal device may determine a group of the time domain resource and a group of the terminal device based on the aggregation level according to an agreed grouping solution. The quantity of symbols of the time domain resource group and/or the corresponding aggregation level sequentially increase/increases in a time sequence. The solution may be applied to a scenario in which the symbols of the first time domain resource are consecutive.

For example, if a channel condition is good, a time domain resource group corresponding to a low aggregation level may be configured for the terminal device; or if a channel condition is poor, a time domain resource group corresponding to a high aggregation level may be configured for the terminal device. The network device sends a PDCCH to the terminal device on the time domain resource group determined based on the aggregation level.

TABLE 2

| Aggregation level and PDCCH division | | |
|---|---|---|
| Quantity of consecutive symbols of a time domain resource | Time domain resource group <=> aggregation level (classification 1) | Time domain resource group <=> aggregation level (classification 2) |
| Q = 4 | {1, 3} <=> {[1, 2, 4], [8, 16]} | |
| Q = 8 | {1, 2, 2, 3} <=> {[1, 2], [4], [8], [16]} | {1, 3, 4} <=> {[1, 2, 4], [8], [16]} |

TABLE 2-continued

| Aggregation level and PDCCH division | | |
|---|---|---|
| Quantity of consecutive symbols of a time domain resource | Time domain resource group <=> aggregation level (classification 1) | Time domain resource group <=> aggregation level (classification 2) |
| Q = 12 | {1, 3, 4, 4} <=> {[1, 2], [4], [8], [16]} | {1, 2, 4, 5} <=> {[1, 2], [4], [8], [16]} |
| Q = 16 | {1, 2, 3, 5, 5} <=> {[1], [2], [4], [8], [16]} | {1, 2, 4, 4, 5} <=> {[1], [2], [4], [8], [16]} |
| Q = 24 | {1, 2, 3, 4, 6, 8} <=> {[1], [2], [4], [8], [16], [32]} | |

In the table, a left part of <=> indicates time domain resource groups, and a right part indicates an aggregation level corresponding to each time domain resource group. For the time domain resource groups, an $m^{th}$ value in "{ }" indicates a quantity of symbols in an $m^{th}$ time domain resource group. In other words, each value in "{ }" corresponds to a quantity of symbols in one time domain resource group. For the aggregation level, a value in a kth "[ ]" in "{ }" is a value range of an aggregation level corresponding to a kth time domain resource group.

There are two types of aggregation levels. For example, based on the classification 1, if the network device indicates, to the first terminal device, that the aggregation level is 8, and the quantity Q of symbols of the time domain resource used by the network device to transmit the PDCCH is 4, the first terminal device may determine, according to Table 2, that the aggregation level 4 in a second "[ ]", and a quantity of symbols of a corresponding time domain resource group is 3. In other words, the first time domain resource is second to fourth symbols (symbols 1 to 3) of the time domain resource used to transmit the PDCCH.

In the solution, the network device and the terminal device may determine a time domain resource group based on an aggregation level. Correspondingly, the terminal device may alternatively determine the aggregation level when the network device indicates the time domain resource group. For example, based on the classification 1, if the quantity Q of symbols of the time domain resource used by the network device to transmit the PDCCH is 4, and the first time domain resource configuration sent by the network device to the first terminal device indicates that the first time domain resource is the second to fourth symbols (the symbols 1 to 3) of the time domain resource used to transmit the PDCCH, the first terminal device may determine, according to Table 2, that the aggregation level is 8 or 16.

In some optional embodiments, a value range of element may be added to the monitoring slot periodicity and offset monitoringSlotPeriodicityandOffset field. For example, the value range of the monitoring slot periodicity and offset field may be extended to {s11, s12, s14, s15, s18, s110, s116, s120, s132, s140, s164, s1128, s180, s1160, s1320, s1640, s11280, s12560, s15120, s110240, s120480}, where s132, s164, s180, s15120, s110240, s120480 are extended elements, and an existing definition is still used for a value of an offset in a corresponding configuration.

Figure 10A:
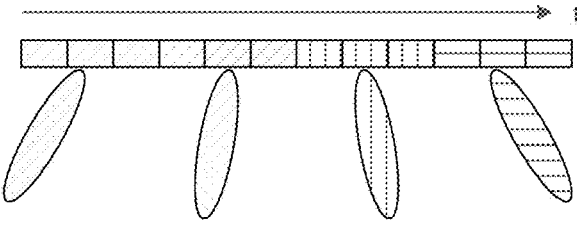
FIG. 10A is a schematic diagram of another PDCCH sending scenario according to an embodiment of this application.

As shown in a schematic diagram of a scenario shown in FIG. 10A, in some optional embodiments, each user group corresponds to one beam direction, and different user groups correspond to different beam directions. The network device sends a PDCCH to a terminal device in each user group in the beam direction corresponding to the user group.

For example, the first user group corresponds to a first beam direction, and the second user group corresponds to a second beam direction. The network device sends the PDCCH to the first terminal device in the first beam direction, and sends the PDCCH to the second terminal device in the second beam direction.

Beam information used by the network device for PDCCH sending may be beam information used to send a physical downlink shared channel (PDSCH) or receive a physical uplink shared channel (PUSCH). In other words, beam information corresponding to each user group may be beam information used by the network device to send a PDSCH of the user group or receive a PUSCH of the user group. The beam information indicates a beam direction.

A new type of beam information may be further defined. A beam width corresponding to the new beam information is narrower than a beam width for transmitting a PDCCH in a conventional method, and is wider than a beam width for transmitting a PDSCH or receiving a PUSCH in the conventional method. Alternatively, the new beam information includes a total of B1 beams (TCI). B1 is greater than a total quantity B2 of beams for a channel state information reference signal (CSI-RS), and is less than a total quantity B3 of beams for a PDSCH or a synchronization signal and PBCH block (SSB). Coverage of the B1 new beams is the same as coverage of the B2 CSI-RS beams and coverage of the B3 SSB beams.

The beam information may be replaced with TCI information or spatial relation information spatialrelationinfo. In other words, functions implemented by using the beam information may be implemented by using the TCI information or the spatial relation information.

The terminal device may be unaware of the beam direction in which the network device sends the PDCCH. In other words, the network device may not indicate, to the terminal device, the beam direction for sending the PDCCH.

Alternatively, the network device may indicate, to the terminal device by using the CORESET or a transmission configuration indicator (TCI) state, the beam direction for sending the PDCCH. In this way, the terminal device may receive the PDCCH by using a receive beam direction corresponding to the beam direction for sending the PDCCH, thereby increasing a PDCCH receiving success probability.

In some embodiments. CORESET numbers indicated for terminal devices in different user groups are different. In other words, the network device may indicate, by using a CORESET number, the beam information for sending the PDCCH. In other words. CORESETs corresponding to different CORESET numbers have different TCI information. Optionally, the CORESET number may also indicate the time domain resource for monitoring the PDCCH by the terminal device.

For example, a CORESET number that is associated with the search space and that is sent by the network device to the first terminal device indicates first beam information or first TCI information. The first terminal device can obtain the first beam information or the first TCI information based on the associated CORESET number, and obtain a CORESET field corresponding to the associated CORESET number, to obtain the location of the first time domain resource based on the CORESET field. In other words, in this solution, the CORESET number may indicate the CORESET, and may also indicate the beam information.

In some other embodiments, a TCI sent by the network device to the terminal device indicates the beam information for sending the PDCCH, and also indicates the time domain resource for monitoring the PDCCH by the terminal device. For example, a TCI sent by the network device to the first terminal device indicates the first beam information and also indicates the first time domain resource.

If the network device sends the PDCCH to the terminal device in each user group in the beam direction corresponding to the user group, beam switching is required in a process in which the network device sends the PDCCH to a plurality of terminal devices. The beam switching takes time.

In some embodiments, in the resource configuration sent by the network device to the terminal device, the indicated quantity Q of symbols of the time domain resource used by the network device for PDCCH sending may include a quantity D×S of symbols of a time domain resource used by the network device for PDCCH sending to each terminal device and a beam switching guard interval G. In this solution. Q=(D+G)×S or D×S+G×(S−1). The value indicated by the duration field in the CORESET may be D or D+G.

Figure 10B:
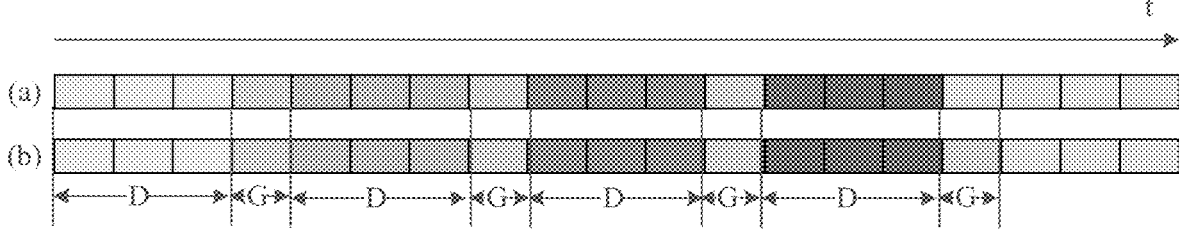
FIG. 10B is a schematic diagram of another PDCCH sending scenario according to an embodiment of this application.

In (a) in a schematic diagram of a scenario shown in FIG. 10B, when Q=(D+G)×S, each time domain resource group corresponds to one beam switching guard interval.

In (b) in the schematic diagram of the scenario shown in FIG. 10B, when Q=D×S+G×(S−1), each of first S−1 time domain resource groups corresponds to one beam switching guard interval, and the last time domain resource group does not have a corresponding beam switching guard interval.

In this solution, when determining the offset, the terminal device also needs to consider G. For example, the first terminal device may determine that the offset corresponding to the first time domain resource is $O_{in} \times (D+G)$, where $O_{in}$ may be an indicated value, a value of mod(ID, S), or a value obtained according to another method listed above.

In some embodiments, a granularity of a DMRS sent by the network device to the terminal device is S symbols. It needs to be defined that a minimum spacing between a location of a front-loaded DMRS and the location of the Q consecutive symbols is less than or equal to a given value. A conventional solution is that a minimum spacing between the location of the front-loaded DMRS and a location of a symbol of a PDCCH successfully detected by the terminal is less than or equal to a given value.

In this embodiment of this application, the time domain resource grouping solution is provided. Correspondingly, frequency domain resources may also be grouped, and a frequency domain resource used by the network device to transmit the PDCCH is divided into a plurality of frequency domain resource groups. Each frequency domain resource group is used to send the PDCCH to a terminal device in a corresponding user group.

In some implementations, the time domain resource grouping solution and the frequency domain resource grouping solution may alternatively be combined. The time domain resource and the frequency domain resource are divided into a plurality of time-frequency resource groups. Each time-frequency resource group corresponds to one user group. Each time-frequency resource is used to send the PDCCH to a terminal device in the corresponding user group, and the terminal device in the user group monitors or blindly detects the PDCCH on the time-frequency resource in the corresponding time-frequency resource group.

It should be understood that the frequency domain resource grouping and time-frequency resource grouping are for ease of description, and are not necessarily objective and actual.

Figure 11:
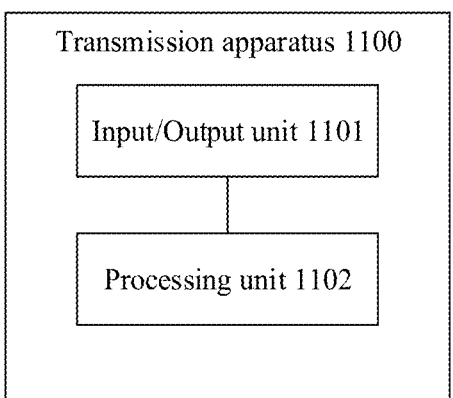
FIG. 11 is a schematic diagram of a structure of a PDCCH transmission apparatus according to an embodiment of this application.

FIG. 11 is a schematic diagram of a structure of a transmission apparatus. An implementation of this application further provides a PDCCH transmission apparatus 1100. The transmission apparatus 1100 may be a network device, or may be used in a network device. The transmission apparatus 1100 includes an input/output unit 1101 and a processing unit 1102. The input/output unit 1101 may be or may be deployed in a unit or module that can implement an information receiving/sending function, such as a transceiver, a transceiver antenna, or an input/output interface. The processing unit 1102 may be or may be deployed in a processor. The input/output unit 1101 is configured to:

send a resource configuration, where the resource configuration indicates a time domain resource used by the network device for physical downlink control channel PDCCH sending; and send a PDCCH of a first terminal device on a first time domain resource in the time domain resource used by the network device for PDCCH sending, and send a PDCCH of a second terminal device on a second time domain resource in the time domain resource used by the network device for PDCCH sending.

According to the technical solution in this application, the PDCCHs are separately sent to different terminal devices on different time domain resources. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration further includes a first time domain resource configuration, and the first time domain resource configuration includes a start symbol of the first time domain resource and a quantity of symbols of the first time domain resource. In this way, the first terminal device may determine the location of the first time domain resource based on the first time domain resource configuration, and monitor the PDCCH on the first time domain resource.

In some implementations, the resource configuration is carried in a field in search space and/or a control-resource set (CORESET) field.

In a possible implementation, a configuration of the start symbol of the first time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

In another possible implementation, a configuration of the start symbol of the first time domain resource is carried in a second field in the search space, a length of the second field is $S_{max}$, and $S_{max}$ is a maximum quantity of slots included in the time domain resource used by the network device for PDCCH sending. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The first terminal device can obtain the start symbol of the first time domain resource based on the offset.

In a possible implementation, the search space or CORESET includes a field indicating the offset. In this way, the first terminal device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, the first time domain resource is determined by the processing unit 1102 based on one or more of an identifier of the first terminal device, a slot index, or a quantity of monitoring times in a current periodicity. In this way, overheads of indicating the first time domain resource configuration by the network device to the first terminal device can be reduced.

In some implementations, the quantity of symbols of the first time domain resource is different from a quantity of symbols of the second time domain resource. In this way, grouping of time domain resources used by the network device for PDCCH sending is more flexible, so that an actual requirement can be better adapted.

In some implementations, the quantity of symbols of the first time domain resource is positively correlated with an aggregation level corresponding to the first time domain resource. In this solution, the network device and the first terminal device can determine the location of the first time domain resource based on the aggregation level. Alternatively, the network device and the first terminal device can determine the aggregation level based on the location of the first time domain resource. This helps reduce signaling overheads.

In some implementations, the symbols of the first time domain resource belong to one slot. In this way, the first terminal device can be prevented from monitoring the PDCCH across slots, thereby reducing complexity of PDCCH monitoring of the terminal device.

It should be understood that the implementations of the first time domain resource are also used for the second time domain resource, and details are not described again.

Figure 12:
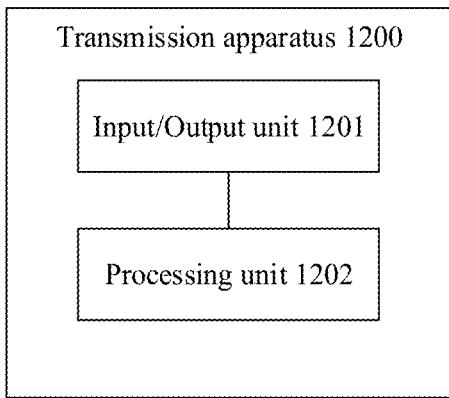
FIG. 12 is a schematic diagram of a structure of another PDCCH transmission apparatus according to an embodiment of this application.

FIG. 12 is a schematic diagram of a structure of a transmission apparatus. This application further provides a PDCCH transmission apparatus 1200. The transmission apparatus may be but is not limited to a terminal device, or may be used in but not limited to a terminal device. The transmission apparatus may include an input/output unit 1201 and a processing unit 1202. The input/output unit 1201 may be or may be deployed in a unit or module that can implement an information receiving/sending function, such as a transceiver, a transceiver antenna, or an input/output interface. The processing unit 1202 may be or may be deployed in a processor. The input/output unit 1201 is configured to:

receive a resource configuration, where the resource configuration includes a time domain resource used by a network device to send a PDCCH; and monitor a PDCCH of the terminal device on a portion of the time domain resource used by the network device for PDCCH sending.

According to the technical solution in this application, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the portion of the time domain resource may be sent by the network device to the terminal device, or may be obtained by the terminal device and the network device in an agreed manner.

In some implementations, the resource configuration further includes a first resource configuration indicating the portion of the time domain resource, and the first time domain resource configuration includes a start symbol of the portion of the time domain resource and a quantity of symbols of the portion of the time domain resource. In this way, the terminal device may determine the location of the first time domain resource based on the first time domain resource configuration, and monitor the PDCCH on the first time domain resource.

In some implementations, the resource configuration is carried in a field in search space and/or a CORESET field.

In a possible implementation, a configuration of the start symbol of the portion of the time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the terminal can directly obtain the location of the start symbol of the first time domain resource based on the first field.

In another possible implementation, a first OFDM symbol of the portion of the time domain resource is a start symbol of a slot, a configuration of the start symbol of the first time domain resource is carried in a second field in the search space, a length of the second field is $S_{max}$, and $S_{max}$ is a maximum quantity of slots of a PDCCH-monitoring span. In this way, the first symbol of the first time domain resource can be limited to only a first symbol of a slot. In this case, the second field only needs to indicate a location of a slot in which the first resource is located in the time domain resource used by the network device for PDCCH sending, to increase an indication granularity and shorten the length of the field indicating the configuration of the start symbol of the first time domain resource, thereby helping reduce signaling overheads.

In some implementations, the first resource configuration includes an offset corresponding to the first time domain resource, and the offset indicates a start symbol, in the time domain resource used by the network device for PDCCH sending, of the start symbol of the first time domain resource. In this solution, the network device indicates the start symbol of the first time domain resource by indicating the offset corresponding to the first time domain resource. The terminal device can obtain the start symbol of the first time domain resource based on the offset.

In a possible implementation, the search space includes a field indicating the offset. In this way, the device can obtain the offset based on the field, so as to obtain the start symbol of the first time domain resource.

In another possible implementation, the search space includes a first CORESET set associated with the search space, the first CORESET set includes the offset, and the CORESET includes a field indicating a number of the first CORESET set. In this way, the offset is indicated by an existing field. This helps reduce indication overheads.

In some implementations, before the terminal device monitors the PDCCH of the terminal device on the portion of the time domain resource used by the network device for PDCCH sending, the processing unit 1202 is configured to determine the portion of the time domain resource based on one or more of an identifier of the terminal device, a slot index, or a quantity of monitoring times in a current periodicity. In this solution, the terminal device may not need to receive, from the network device, the first time domain resource configuration indicating the first time domain resource, so that overheads of indicating the first time domain resource configuration by the network device to the first terminal device can be reduced.

In some implementations, the quantity of symbols of the portion of the time domain resource is positively correlated with an aggregation level corresponding to the portion of the time domain resource. In this solution, the network device and the first terminal device can determine the location of the first time domain resource based on the aggregation level. Alternatively, the network device and the first terminal device can determine the aggregation level based on the location of the first time domain resource. This helps reduce signaling overheads.

In some implementations, the symbols of the portion of the time domain resource belong to one slot. In this way, the terminal device can be prevented from monitoring the PDCCH across slots, thereby reducing complexity of PDCCH monitoring of the terminal device.

It should be understood that the implementations of the first time domain resource are also used for the second time domain resource, and details are not described again.

Figure 13:
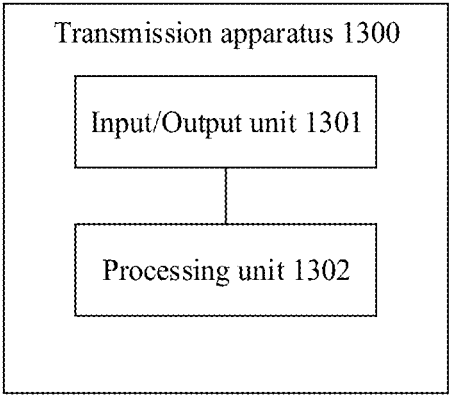
FIG. 13 is a schematic diagram of a structure of another PDCCH transmission apparatus according to an embodiment of this application.

FIG. 13 is a schematic diagram of a structure of a transmission apparatus. An implementation of this application further provides a PDCCH transmission apparatus

1300. The transmission apparatus may be a network device, or may be used in a network device. The transmission apparatus includes an input/output unit 1301 and a processing unit 1302. The input/output unit 1301 may be or may be deployed in a unit or module that can implement an information receiving/sending function, such as a transceiver, a transceiver antenna, or an input/output interface. The processing unit 1302 may be or may be deployed in a processor. The input/output unit 1301 is configured to:

send a resource configuration, where the resource configuration includes a first time domain resource configuration and a second time domain resource configuration, the first time domain resource configuration indicates a first time domain resource, and the second time domain resource configuration indicates a second time domain resource; and send a PDCCH to a first terminal device on the first time domain resource, and send the PDCCH to a second terminal device on the second time domain resource.

In this solution, a time domain resource used to send the PDCCH is divided into the first time domain resource and the second time domain resource. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

A location of the first time domain resource may be sent by the network device to the first terminal device, or may be obtained by the first terminal device and the network device in an agreed manner. A location of the second time domain resource may be sent by the network device to the second terminal device, or may be obtained by the second terminal device and the network device in an agreed manner.

In a possible implementation, symbols of the first time domain resource are consecutive, and symbols of the second time domain resource are also consecutive. In other words, symbols of time domain resources in one group are consecutive. In this way, the terminal device can monitor the PDCCH in a plurality of consecutive symbols, so that the increase in the complexity of PDCCH monitoring of the terminal device can be more effectively avoided.

In another possible implementation, symbols of the first time domain resource are separated, and symbols of the second time domain resource are also separated. For example, the symbols of the first time domain resource and the symbols of the second time domain resource are distributed at intervals in a comb shape. In this way, a time span of the first time domain resource can be increased, and a time span of the second time domain resource can also be increased, thereby improving robustness of PDCCH monitoring on a time-varying channel, and increasing a probability of successful PDCCH monitoring of the terminal device.

In some implementations, the resource configuration is carried in a field in search space and/or a control-resource set (CORESET) field.

In a possible implementation, a configuration of a start symbol of the first time domain resource is carried in a first field in the search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

Figure 14:
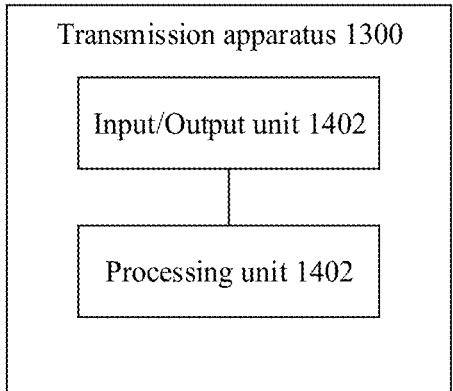
FIG. 14 is a schematic diagram of a structure of another PDCCH transmission apparatus according to an embodiment of this application.

FIG. 14 is a schematic diagram of a structure of a transmission apparatus. This application further provides a PDCCH transmission apparatus 1400. The transmission apparatus 1400 may be but is not limited to a terminal device, or may be used in but not limited to a terminal device. The transmission apparatus may include an input/output unit 1401 and a processing unit 1402. The input/output unit 1401 may be or may be deployed in a unit or module that can implement an information receiving/sending function, such as a transceiver, a transceiver antenna, or an input/output interface. The processing unit 1402 may be or may be deployed in a processor. The input/output unit 1401 is configured to:

receive a first time domain resource configuration from a network device, where the first time domain resource configuration includes a start symbol of a first time domain resource and a quantity of symbols of the portion of the time domain resource, and the first time domain resource is a portion of a time domain resource used by the network device for PDCCH sending; and monitor the PDCCH on the first time domain resource based on the first time domain resource configuration.

In this solution, the terminal device needs to monitor the PDCCH only on the portion of the time domain resource used for PDCCH sending. In this way, when a quantity of symbols used by the network device for PDCCH sending is increased to meet requirements of a plurality of users, a terminal device needs to monitor a PDCCH only on a portion of the time domain resource used for PDCCH sending, and an increase in complexity of PDCCH monitoring of the terminal device can also be avoided.

Symbols of the first time domain resource may be consecutive or separated.

In a possible implementation, a configuration of the start symbol of the first time domain resource is carried in a first field in search space, a quantity of symbols of the first field is $14 \times S_{max}$, and $S_{max}$ is a maximum quantity of slots of a PDCCH-monitoring span. In this way, the first field can indicate an absolute location of the start symbol of the first time domain resource in a PDCCH-monitoring span, flexibility of the location of the first time domain resource is high, and the first terminal can directly obtain the location of the start symbol of the first time domain resource based on the first field.

This application provides a computer-readable storage medium. The computer-readable storage medium stores computer instructions. The computer instructions instruct a server to perform the PDCCH transmission method provided in any one of the foregoing implementations.

It should be further understood that "first", "second", "third", "fourth", and various numbers in this specification are merely used for differentiation for ease of description, and are not intended to limit the scope of this application.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the processes do not mean execution sequences in various embodiments of this application. The execution sequences of the processes need to be determined according to functions and internal logic of the processes, and should not be construed as any limitation on the implementation processes of embodiments of this application.

Persons of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. Persons skilled in the art may use different methods to implement the described functions of each particular application, but it should not be considered that the implementation goes beyond the scope of this application.

It may be clearly understood by persons skilled in the art that, for convenient and brief description, for a detailed working process of the foregoing system, apparatus, and unit, refer to a corresponding process in the method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve an objective of the solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A physical downlink control channel (PDCCH) transmission method, comprising:
receiving, by a terminal device, search space sent by a network device, wherein the search space comprises a monitoring slot periodicity and offset field, a duration field, and a second field, the monitoring slot periodicity and offset field indicates a monitoring periodicity and a monitoring offset of a PDCCH, the duration field indicates a total quantity of slots comprised in a PDCCH-monitoring span in which monitoring needs to be consecutively performed in one monitoring periodicity, a length of the second field is Smax, and Smax is a quantity of slots comprised in the PDCCH-monitoring span; and
determining, by the terminal device based on the monitoring slot periodicity and offset field, the duration field, and the second field, a specific monitoring span for transmitting the PDCCH.

2. The method according to claim 1, wherein the PDCCH-monitoring span comprises a plurality of slots and some of the plurality of slots are used by the terminal device for PDCCH monitoring.

3. The method according to claim 1, wherein a value of the monitoring slot periodicity and offset field is {s11, s12, s14, s15, s18, s110, s116, s120, s132, s140, s164, s1128, s180, s1160, s1320, s1640, s11280, s12560, s15120, s110240, s120480}.

4. A physical downlink control channel (PDCCH) transmission method, comprising:
sending, by a network device, search space to a terminal device, wherein the search space comprises a monitoring slot periodicity and offset field, a duration field, and a second field, the monitoring slot periodicity and offset field indicates a monitoring periodicity and a monitoring offset of a PDCCH, the duration field indicates a total quantity of slots comprised in a PDCCH-monitoring span in which monitoring needs to be consecutively performed in one monitoring periodicity, a length of the second field is Smax, and Smax is a quantity of slots comprised in the PDCCH-monitoring span,
wherein the monitoring slot periodicity and offset field, the duration field, and the second field are used to determine a specific monitoring span for transmitting the PDCCH.

5. The method according to claim 4, wherein the PDCCH-monitoring span comprises a plurality of slots and some of the plurality of slots are used by the terminal device for PDCCH monitoring.

6. The method according to claim 4, wherein a value of the monitoring slot periodicity and offset field is {s11, s12, s14, s15, s18, s110, s116, s120, s132, s140, s164, s1128, s180, s1160, s1320, s1640, s11280, s12560, s15120, s110240, s120480}.

7. A physical downlink control channel (PDCCH) transmission apparatus, comprising a processor, wherein the processor is coupled to a memory, the memory is configured to store computer instructions, and the processor executes the computer instructions to cause the apparatus to:

receive search space, wherein the search space comprises a monitoring slot periodicity and offset field, a duration field, and a second field, the monitoring slot periodicity and offset field indicates a monitoring periodicity and a monitoring offset of a PDCCH, the duration field indicates a total quantity of slots comprised in a PDCCH-monitoring span in which monitoring needs to be consecutively performed in one monitoring periodicity, a length of the second field is Smax, and Smax is a quantity of slots comprised in the PDCCH-monitoring span; and determine, based on the monitoring slot periodicity and offset field, the duration field, and the second field, a specific monitoring span for transmitting the PDCCH.

8. The apparatus according to claim 7, wherein the PDCCH-monitoring span comprises a plurality of slots and some of the plurality of slots are used by a terminal device for PDCCH monitoring.

9. The apparatus according to claim 7, wherein a value of the monitoring slot periodicity and offset field is {s11, s12, s14, s15, s18, s110, s116, s120, s132, s140, s164, s1128, s180, s1160, s1320, s1640, s11280, s12560, s15120, s110240, s120480}.

10. A physical downlink control channel (PDCCH) transmission apparatus, comprising a processor, wherein the processor is coupled to a memory, the memory is configured to store computer instructions, and the processor executes the computer instructions to cause the apparatus to:

send search space, wherein the search space comprises a monitoring slot periodicity and offset field, a duration field, and a second field, the monitoring slot periodicity and offset field indicates a monitoring periodicity and a monitoring offset of a PDCCH, the duration field indicates a total quantity of slots comprised in a PDCCH-monitoring span in which monitoring needs to be consecutively performed in one monitoring periodicity, a length of the second field is Smax, and Smax is a quantity of slots comprised in the PDCCH-monitoring span, wherein the monitoring slot periodicity and offset field, the duration field, and the second field are used to determine a specific monitoring span for transmitting the PDCCH.

11. The apparatus according to claim 10, wherein the PDCCH-monitoring span comprises a plurality of slots and some of the plurality of slots are used by a terminal device for PDCCH monitoring.

12. The apparatus according to claim 10, wherein a value of the monitoring slot periodicity and offset field is {s11, s12, s14, s15, s18, s110, s116, s120, s132, s140, s164, s1128, s180, s1160, s1320, s1640, s11280, s12560, s15120, s110240, s120480}.

* * * * *